US012407999B2

(12) United States Patent
Eronen et al.

(10) Patent No.: US 12,407,999 B2
(45) Date of Patent: Sep. 2, 2025

(54) ADJUSTMENT OF REVERBERATOR BASED ON SOURCE DIRECTIVITY

(71) Applicant: Nokia Technologies Oy, Espoo (FI)

(72) Inventors: Antti Johannes Eronen, Tampere (FI); Sujeet Shyamsundar Mate, Tampere (FI); Pasi Liimatainen, Lempaala (FI); Archontis Politis, Tampere (FI); Jaakko Valdemar Hyry, Oulu (FI); Mikko-Ville Laitinen, Espoo (FI)

(73) Assignee: Nokia Technologies Oy, Espoo (FI)

( * ) Notice: Subject to any disclaimer, the term of this patent is extended or adjusted under 35 U.S.C. 154(b) by 91 days.

(21) Appl. No.: 18/072,827

(22) Filed: Dec. 1, 2022

(65) Prior Publication Data

US 2023/0179947 A1 Jun. 8, 2023

(30) Foreign Application Priority Data

Dec. 3, 2021 (GB) ...................................... 2117527

(51) Int. Cl.
*H04S 7/00* (2006.01)
*H04S 3/00* (2006.01)

(52) U.S. Cl.
CPC .............. *H04S 7/305* (2013.01); *H04S 3/008* (2013.01); *H04S 7/302* (2013.01); *H04S 2420/01* (2013.01)

(58) Field of Classification Search
CPC ....... G10L 19/008; G10L 19/00; G10L 19/20; G10L 19/02; G10L 19/06; G10L 19/005; G10L 19/002; H04S 2400/11; H04S 2420/03; H04S 2420/01; H04S 3/008; H04S 5/005; H04S 7/302; H04S 7/305; H04S 7/30; H04S 3/02; H04S 7/304; H04S 7/306; H04S 2420/07; H04S 3/00; H04S 7/303; H04S 2400/01; H04S 2420/11; H04S 2400/03; H04S 2420/13; H04S 5/00; H04S 7/00; H04S 7/308; H04S 2400/13;

(Continued)

(56) References Cited

U.S. PATENT DOCUMENTS

2010/0241845 A1* 9/2010 Alonso .............. H04N 21/4788 715/753
2017/0257722 A1* 9/2017 Kerdranvat ............. H04S 3/002

(Continued)

FOREIGN PATENT DOCUMENTS

GB 2593170 A 9/2021
JP 2021528001 A 10/2021

(Continued)

*Primary Examiner* — Lun-See Lao
(74) *Attorney, Agent, or Firm* — McCarter & English, LLP

(57) ABSTRACT

An apparatus for assisting spatial rendering for room acoustics, the apparatus including means configured to: obtain directivity data having an identifier, wherein the directivity data includes data for at least two separate directions; obtain at least one room parameter; determine information associated with the directivity data; determine gain data based on the determined information; determine averaged gain data based on the gain data; and generate a bitstream defining a rendering, the bitstream including the averaged gain data and the at least one room parameter such that at least one audio signal associated with the identifier is configured to be rendered based on the at least one room parameter and the determined averaged gain data.

10 Claims, 12 Drawing Sheets

(58) Field of Classification Search
CPC ................ H04S 2400/15; G10H 1/361; G10H 2210/301; G06F 3/165; H04R 27/00; H04R 5/02; H04R 5/04; G10K 15/08
USPC ................................ 381/1–3, 56–58; 700/94
See application file for complete search history.

(56) References Cited

U.S. PATENT DOCUMENTS

| | | | | |
|---|---|---|---|---|
| 2018/0232471 | A1* | 8/2018 | Schissler | G06F 18/2413 |
| 2019/0387350 | A1* | 12/2019 | Audfray | H04R 3/12 |
| 2021/0160617 | A1* | 5/2021 | Neerbek | H04S 7/302 |
| 2021/0287651 | A1 | 9/2021 | Eronen et al. | |
| 2023/0146772 | A1* | 5/2023 | Snook | H04S 7/303<br>381/303 |

FOREIGN PATENT DOCUMENTS

| | | | |
|---|---|---|---|
| WO | WO 2014/159272 | A1 | 10/2014 |
| WO | WO 2016/014254 | A1 | 1/2016 |
| WO | WO-2019/246159 | A1 | 12/2019 |

* cited by examiner

ADJUSTMENT OF REVERBERATOR BASED ON SOURCE DIRECTIVITY

FIELD

The present application relates to apparatus and methods for spatial audio reproduction by the adjustment of reverberators based on source directivity properties, but not exclusively for spatial audio reproduction by the adjustment of reverberators based on source directivity positioning in augmented reality and/or virtual reality apparatus.

BACKGROUND

Reverberation refers to the persistence of sound in a space after the actual sound source has stopped. Different spaces are characterized by different reverberation characteristics. For conveying spatial impression of an environment, reproducing reverberation perceptually accurately is important. Room acoustics are often modelled with individually synthesized early reflection portion and a statistical model for the diffuse late reverberation. FIG. 1 depicts an example of a synthesized room impulse response where the direct sound 101 is followed by discrete early reflections 103 which have a direction of arrival (DOA) and diffuse late reverberation 105 which can be synthesized without any specific direction of arrival. The delay d1(t) 102 in FIG. 1 can be seen to denote the direct sound arrival delay from the source to the listener and the delay d2(t) 104 can denote the delay from the source to the listener for one of the early reflections (in this case the first arriving reflection).

One method of reproducing reverberation is to utilize a set of N loudspeakers (or virtual loudspeakers reproduced binaurally using a set of head-related transfer functions (HRTF)). The loudspeakers are positioned around the listener somewhat evenly. Mutually incoherent reverberant signals are reproduced from these loudspeakers, producing a perception of surrounding diffuse reverberation.

The reverberation produced by the different loudspeakers has to be mutually incoherent. In a simple case the reverberations can be produced using the different channels of the same reverberator, where the output channels are uncorrelated but otherwise share the same acoustic characteristics such as RT60 time and level (specifically, the diffuse-to-direct ratio or reverberant-to-direct ratio). Such uncorrelated outputs sharing the same acoustic characteristics can be obtained, for example, from the output taps of a Feedback-Delay-Network (FDN) reverberator with suitable tuning of the delay line lengths, or from a reverberator based on using decaying uncorrelated noise sequences by using a different uncorrelated noise sequence in each channel. In this case, the different reverberant signals effectively have the same features, and the reverberation is typically perceived to be similar to all directions.

SUMMARY

There is provided according to a first aspect an apparatus for assisting spatial rendering for room acoustics, the apparatus comprising means configured to: obtain directivity data having an identifier, wherein the directivity data comprises data for at least two separate directions; obtain at least one room parameter; determine information associated with the directivity data; determine gain data based on the determined information; determine averaged gain data based on the gain data; and generate a bitstream defining a rendering, the bitstream comprising the averaged gain data and the at least one room parameter such that at least one audio signal associated with the identifier is configured to be rendered based on the at least one room parameter and the determined averaged gain data.

The means configured to determine information associated with the directivity data may be configured to determine a directivity-model based on the directivity data.

The directivity model may be one of: a two-dimensional directivity model, wherein the at least two directions are arranged on a plane; and a three-dimensional directivity model, wherein the at least two directions are arranged within a volume.

The means configured to determine averaged gain data may be configured to determine averaged gain data based on a spatial averaging of the gain data independent of a sound source direction and/or orientation.

The means configured to determine information associated with the directivity data may be configured to estimate a continuous directivity model based on the obtained directivity data.

The means configured to determine averaged gain data may be configured to determine gain data based on a spatial averaging of gains for the at least two separate directions further based on the determined directivity-model.

The means configured to obtain at least one room parameter may be configured to obtain at least one digital reverberator parameter.

The means configured to determine averaged gain data based on the gain data may be configured to determine frequency dependent gain data.

The frequency dependent gain data may be graphic equalizer coefficients.

There is provided according to a second aspect an apparatus for spatial rendering for room acoustics, the apparatus comprising means configured to: obtain a bitstream, the bitstream comprising: averaged gain data based on an averaging of gain data; an identifier associated with at least one audio signal or the at least one audio signal; and at least one room parameter; configure at least one reverberator based on the averaged gain data and the at least one room parameter; and apply the at least one reverberator to the at least one audio signal as at least part of the rendering of the at least one audio signal.

The at least one room parameter may comprise at least one digital reverberator parameter.

The averaged gain data may comprise frequency dependent gain data.

The frequency dependent gain data may be graphic equalizer coefficients.

The averaged gain data may be spatially averaged gain data.

The means configured to apply the at least one reverberator to the at least one audio signal as at least part of the rendering of the at least one audio signal may be further configured to: apply the averaged gain data to the at least one audio signal to generate a directivity-influenced audio signal; and apply a digital reverberator configured based on the at least one room parameter to the directivity-influenced audio signal to generate a directivity-influenced reverberated audio signal.

The averaged gain data may comprise at least one set of gains which are grouped gains wherein the grouped gains are grouped because of a similar directivity pattern.

The similar directivity pattern may comprise a difference between directivity patterns less than a determined threshold value.

According to a third aspect there is provided a method for an apparatus for assisting spatial rendering for room acoustics, the method comprising: obtaining directivity data having an identifier, wherein the directivity data comprises data for at least two separate directions; obtaining at least one room parameter; determining information associated with the directivity data; determining gain data based on the determined information; determining averaged gain data based on the gain data; and generating a bitstream defining a rendering, the bitstream comprising the averaged gain data and the at least one room parameter such that at least one audio signal associated with the identifier is configured to be rendered based on the at least one room parameter and the determined averaged gain data.

Determining information associated with the directivity data may comprise determining a directivity-model based on the directivity data.

The directivity model may be one of: a two-dimensional directivity model, wherein the at least two directions are arranged on a plane; and a three-dimensional directivity model, wherein the at least two directions are arranged within a volume.

Determining averaged gain data may comprise determining averaged gain data based on a spatial averaging of the gain data independent of a sound source direction and/or orientation.

Determining information associated with the directivity data may comprise estimating a continuous directivity model based on the obtained directivity data.

Determining averaged gain data may comprise determining gain data based on a spatial averaging of gains for the at least two separate directions further based on the determined directivity-model.

Obtaining at least one room parameter may comprise obtaining at least one digital reverberator parameter.

Determining averaged gain data based on the gain data may comprise determining frequency dependent gain data.

The frequency dependent gain data may be graphic equalizer coefficients.

There is provided according to a fourth aspect a method for an apparatus for spatial rendering for room acoustics, the method comprising: obtaining a bitstream, the bitstream comprising: averaged gain data based on an averaging of gain data; an identifier associated with at least one audio signal or the at least one audio signal; and at least one room parameter; configuring at least one reverberator based on the averaged gain data and the at least one room parameter; and applying the at least one reverberator to the at least one audio signal as at least part of the rendering of the at least one audio signal.

The at least one room parameter may comprise at least one digital reverberator parameter.

The averaged gain data may comprise frequency dependent gain data.

The frequency dependent gain data may be graphic equalizer coefficients.

The averaged gain data may be spatially averaged gain data.

Applying the at least one reverberator to the at least one audio signal as at least part of the rendering of the at least one audio signal may comprise: applying the averaged gain data to the at least one audio signal to generate a directivity-influenced audio signal; and applying a digital reverberator configured based on the at least one room parameter to the directivity-influenced audio signal to generate a directivity-influenced reverberated audio signal.

The averaged gain data may comprise at least one set of gains which are grouped gains wherein the grouped gains are grouped because of a similar directivity pattern.

The similar directivity pattern may comprise a difference between directivity patterns less than a determined threshold value.

According to a fifth aspect there is provided an apparatus for assisting spatial rendering for room acoustics, the apparatus comprising at least one processor and at least one memory including a computer program code, the at least one memory and the computer program code configured to, with the at least one processor, cause the apparatus at least to: obtain directivity data having an identifier, wherein the directivity data comprises data for at least two separate directions; obtain at least one room parameter; determine information associated with the directivity data; determine gain data based on the determined information; determine averaged gain data based on the gain data; and generate a bitstream defining a rendering, the bitstream comprising the averaged gain data and the at least one room parameter such that at least one audio signal associated with the identifier is configured to be rendered based on the at least one room parameter and the determined averaged gain data.

The apparatus caused to determine information associated with the directivity data may be caused to determine a directivity-model based on the directivity data.

The directivity model may be one of: a two-dimensional directivity model, wherein the at least two directions are arranged on a plane; and a three-dimensional directivity model, wherein the at least two directions are arranged within a volume.

The apparatus caused to determine averaged gain data may be caused to determine averaged gain data based on a spatial averaging of the gain data independent of a sound source direction and/or orientation.

The apparatus caused to determine information associated with the directivity data may be caused to estimate a continuous directivity model based on the obtained directivity data.

The apparatus caused to determine averaged gain data may be caused to determine gain data based on a spatial averaging of gains for the at least two separate directions further based on the determined directivity-model.

The apparatus caused to obtain at least one room parameter may be caused to obtain at least one digital reverberator parameter.

The apparatus caused to determine averaged gain data based on the gain data may be caused to determine frequency dependent gain data.

The frequency dependent gain data may be graphic equalizer coefficients.

There is provided according to a sixth aspect an apparatus for spatial rendering for room acoustics, the apparatus comprising at least one processor and at least one memory including a computer program code, the at least one memory and the computer program code configured to, with the at least one processor, cause the apparatus at least to: obtain a bitstream, the bitstream comprising: averaged gain data based on an averaging of gain data; an identifier associated with at least one audio signal or the at least one audio signal; and at least one room parameter; configure at least one reverberator based on the averaged gain data and the at least one room parameter; and apply the at least one reverberator to the at least one audio signal as at least part of the rendering of the at least one audio signal.

The at least one room parameter may comprise at least one digital reverberator parameter.

The averaged gain data may comprise frequency dependent gain data.

The frequency dependent gain data may be graphic equalizer coefficients.

The averaged gain data may be spatially averaged gain data.

The apparatus caused to apply the at least one reverberator to the at least one audio signal as at least part of the rendering of the at least one audio signal may be further caused to: apply the averaged gain data to the at least one audio signal to generate a directivity-influenced audio signal; and apply a digital reverberator configured based on the at least one room parameter to the directivity-influenced audio signal to generate a directivity-influenced reverberated audio signal.

The averaged gain data may comprise at least one set of gains which are grouped gains wherein the grouped gains are grouped because of a similar directivity pattern.

The similar directivity pattern may comprise a difference between directivity patterns less than a determined threshold value.

According to a seventh aspect there is provided an apparatus comprising: obtaining circuitry configured to obtain directivity data having an identifier, wherein the directivity data comprises data for at least two separate directions; obtaining circuitry configured to obtain at least one room parameter; determining circuitry configured to determine information associated with the directivity data; determining circuitry configured to determine gain data based on the determined information; determining circuitry configured to determine averaged gain data based on the gain data; and generating circuitry configured to generate a bitstream defining a rendering, the bitstream comprising the averaged gain data and the at least one room parameter such that at least one audio signal associated with the identifier is configured to be rendered based on the at least one room parameter and the determined averaged gain data.

According to an eighth aspect there is provided an apparatus comprising: obtaining circuitry configured to obtain a bitstream, the bitstream comprising: averaged gain data based on an averaging of gain data; an identifier associated with at least one audio signal or the at least one audio signal; and at least one room parameter; configuring circuitry configured to configure at least one reverberator based on the averaged gain data and the at least one room parameter; and applying circuitry configured to apply the at least one reverberator to the at least one audio signal as at least part of the rendering of the at least one audio signal.

According to a ninth aspect there is provided a computer program comprising instructions [or a computer readable medium comprising program instructions] for causing an apparatus to perform at least the following: obtain directivity data having an identifier, wherein the directivity data comprises data for at least two separate directions; obtain at least one room parameter; determine information associated with the directivity data; determine gain data based on the determined information; determine averaged gain data based on the gain data; and generate a bitstream defining a rendering, the bitstream comprising the averaged gain data and the at least one room parameter such that at least one audio signal associated with the identifier is configured to be rendered based on the at least one room parameter and the determined averaged gain data.

According to a tenth aspect there is provided a computer program comprising instructions [or a computer readable medium comprising program instructions] for causing an apparatus to perform at least the following: obtain a bitstream, the bitstream comprising: averaged gain data based on an averaging of gain data; an identifier associated with at least one audio signal or the at least one audio signal; and at least one room parameter; configure at least one reverberator based on the averaged gain data and the at least one room parameter; and apply the at least one reverberator to the at least one audio signal as at least part of the rendering of the at least one audio signal.

According to an eleventh aspect there is provided a non-transitory computer readable medium comprising program instructions for causing an apparatus to perform at least the following: obtain directivity data having an identifier, wherein the directivity data comprises data for at least two separate directions; obtain at least one room parameter; determine information associated with the directivity data; determine gain data based on the determined information; determine averaged gain data based on the gain data; and generate a bitstream defining a rendering, the bitstream comprising the averaged gain data and the at least one room parameter such that at least one audio signal associated with the identifier is configured to be rendered based on the at least one room parameter and the determined averaged gain data.

According to a twelfth aspect there is provided a non-transitory computer readable medium comprising program instructions for causing an apparatus to perform at least the following: obtain a bitstream, the bitstream comprising: averaged gain data based on an averaging of gain data; an identifier associated with at least one audio signal or the at least one audio signal; and at least one room parameter; configure at least one reverberator based on the averaged gain data and the at least one room parameter; and apply the at least one reverberator to the at least one audio signal as at least part of the rendering of the at least one audio signal.

According to a thirteenth aspect there is provided an apparatus comprising: means for obtaining directivity data having an identifier, wherein the directivity data comprises data for at least two separate directions; obtain at least one room parameter; means for determining information associated with the directivity data; means for determining gain data based on the determined information; means for determining averaged gain data based on the gain data; and means for generating a bitstream defining a rendering, the bitstream comprising the averaged gain data and the at least one room parameter such that at least one audio signal associated with the identifier is configured to be rendered based on the at least one room parameter and the determined averaged gain data.

According to a fourteenth aspect there is provided an apparatus comprising: means for obtaining a bitstream, the bitstream comprising: averaged gain data based on an averaging of gain data; an identifier associated with at least one audio signal or the at least one audio signal; and at least one room parameter; means for configuring at least one reverberator based on the averaged gain data and the at least one room parameter; and means for applying the at least one reverberator to the at least one audio signal as at least part of the rendering of the at least one audio signal.

According to a fifteenth aspect there is provided a computer readable medium comprising program instructions for causing an apparatus to perform at least the following: obtain directivity data having an identifier, wherein the directivity data comprises data for at least two separate directions; obtain at least one room parameter; determine information associated with the directivity data; determine gain data based on the determined information; determine averaged gain data based on the gain data; and generate a bitstream defining a rendering, the bitstream comprising the averaged gain data and the at least one room parameter such that at least one audio signal associated with the identifier is configured to be rendered based on the at least one room parameter and the determined averaged gain data.

According to a sixteenth aspect there is provided a computer readable medium comprising program instructions for causing an apparatus to perform at least the following: obtain a bitstream, the bitstream comprising: averaged gain data based on an averaging of gain data; an identifier associated with at least one audio signal or the at least one audio signal; and at least one room parameter; configure at least one reverberator based on the averaged gain data and the at least one room parameter; and apply the at least one reverberator to the at least one audio signal as at least part of the rendering of the at least one audio signal.

An apparatus comprising means for performing the actions of the method as described above.

An apparatus configured to perform the actions of the method as described above.

A computer program comprising program instructions for causing a computer to perform the method as described above.

A computer program product stored on a medium may cause an apparatus to perform the method as described herein.

An electronic device may comprise apparatus as described herein.

A chipset may comprise apparatus as described herein.

Embodiments of the present application aim to address problems associated with the state of the art.

SUMMARY OF THE FIGURES

For a better understanding of the present application, reference will now be made by way of example to the accompanying drawings in which.

EMBODIMENTS OF THE APPLICATION

Figure 1:
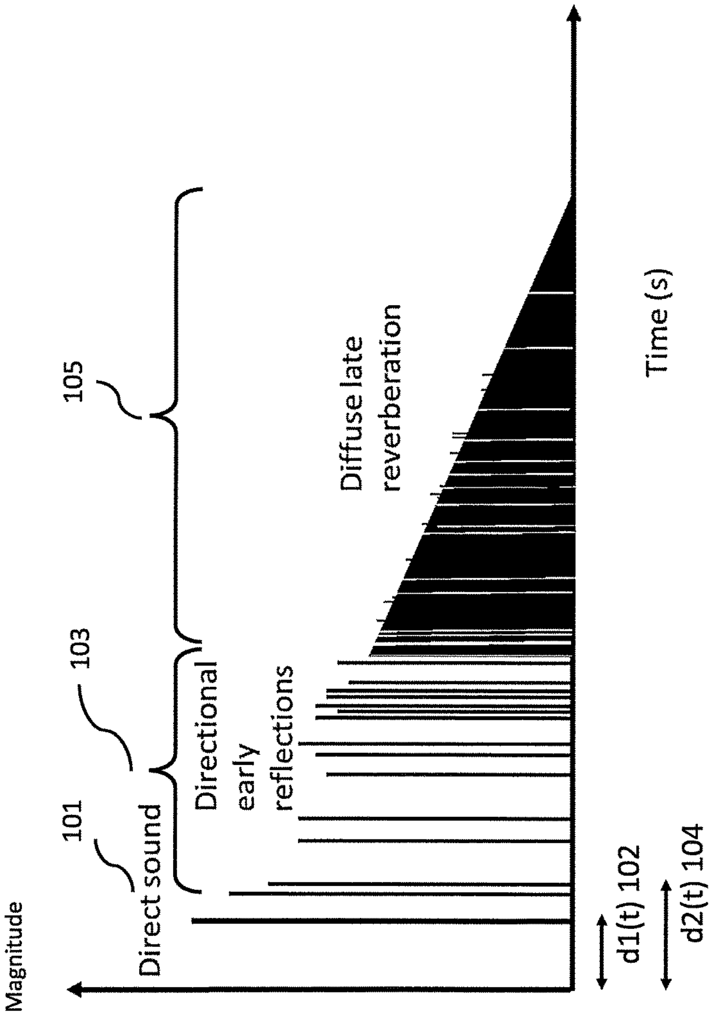
FIG. 1 shows a model of room acoustics and the room impulse response.

The following describes in further detail suitable apparatus and possible mechanisms for parameterizing and rendering audio scenes with reverberation.

As discussed above reverberation can be rendered using, e.g., a Feedback-Delay-Network (FDN) reverberator with a suitable tuning of delay line lengths. An FDN allows to control the reverberation times (RT60) and the energies of different frequency bands individually. Thus, it can be used to render the reverberation based on the characteristics of the room or modelled space. The reverberation times and the energies of the different frequencies are affected by the frequency-dependent absorption characteristics of the room.

Moreover, the directivities of the sound sources affect the energies of the different frequencies. For example a human talker is affected as the human head and body can acoustically shadow the sound. This can create the effect where direct sound is attenuated when listening from behind the talker when compared to listening in front of the talker. This attenuation is frequency dependent, as the shadowing caused by the head and the body is dependent on the wavelength. As simplified, the human talker is nearly omnidirectional at low frequencies (where the wavelength is long), whereas the human talker is quite directional at high frequencies (where the wavelength is short).

The directivity can also affect late reverberation (using the same example of a human talker in the following). At low frequencies, as the (human talker) sound source is practically omnidirectional, the reverberation can be applied directly using a known frequency-dependent energy and the reverberation time (which are typically determined for an omnidirectional source).

However at high frequencies considering all sources as omnidirectional does not give optimal reverberation quality. The human talker is radiating sound with the "normal" frequency response to the front (the audio signal is typically captured with a microphone in the front, so the captured audio signal contains this frequency response), whereas the sound is significantly attenuated at the back at high frequencies. Thus, in practice, late reverberation contributions are attenuated at high frequencies because of the directivity of the human talker. Generally, the more directive a source is at a certain frequency the less energy it contributes to the reverberation in the room at that frequency.

Thus when rendering late reverberation, frequency-dependent reverberation times and energies of the room have to be taken into account, as well as the frequency-dependent directivity of the sound sources.

The directivity of the sound source may be available in many ways. One example is to measure (or to model) the magnitude frequency response of the source to various directions around the source, and to compute the ratio between these magnitude frequency responses and the magnitude frequency response to the front directions. Thus, it describes how much the sound is attenuated at different frequencies to these directions.

In case this directivity data would be available for any possible direction with infinite resolution, a spatially even (or in practice pseudo-even) distribution over all 3D directions could be selected (e.g., 100 data points evenly distributed in 3D). Then, an average of those could be computed, and the reverberated signal could be processed with the resulting magnitude frequency response (or filtered with a corresponding filter).

However, directivity data is rarely available with an infinite resolution. The directivity data is typically available only for a limited number of directions. Moreover, the distribution of the data points may not be even (over space). For example the directivity data may be available for many directions on the front, but only to few directions behind the source. This may significantly bias the magnitude frequency response if a simple average of them is computed.

In some situations, a sound engineer could hand-tune a suitable magnitude frequency response based on the available directivity information. However, this is not possible for automatic systems or without some manual (possibly artistic) work by a sound engineer, etc.

Thus there is a need to be able to determine and render the effect of a source directivity on the magnitude frequency response of the late reverberation in an effective manner and without significant or any user input (or interaction).

The concept as discussed in the embodiments in further detail herein relate to reproduction of late reverberation components of sound sources. In these embodiments apparatus and methods are proposed that enable rendering late reverberation based on the sound source directivity data in order to take the spectral effect caused by the directivity into account. This in some embodiments is achieved by obtaining directivity data for a number of distinct directions, determining from a directivity model whether the directivity data is two or three dimensional, estimating spatial areas for the directivity data based on the directivity model, estimating frequency-dependent directivity-influenced reverberation gain data based on the spatial areas, and rendering late reverberation based on the directivity-influenced reverberation gain data (and audio signal(s) and room-related parameters, such as frequency-dependent reverberation times and energies).

Moreover, in some embodiments, sound sources having the determined directivity-influenced reverberation gain data close to each other (differences being below a threshold) are pooled together, and average directivity-influenced reverberation gain data is determined for each pool, and the average directivity-influenced reverberation gain data can be applied only once to the sum of the audio signals of the pool, improving the computational efficiency.

In some embodiments, the directivity-influenced reverberation gain data may be determined in an encoder, and it may be transmitted (for example, as graphical equalizer coefficients) to a decoder, which may apply them when rendering the late reverberation. Moreover, in some embodiments in the situation where there is pooled directivity-influenced reverberation gain data, only the average directivity-influenced reverberation gain data may be transmitted, and indices to the different average directivity-influenced reverberation gain data may be transmitted for each sound source, minimizing the required bit rate for the transmission.

In some embodiments, the directivity-influenced reverberation gain data for different audio elements can be collated to a common source directivity pattern with a unique identifier. For example, each audio element (audio object or channel) can have a source directivity pattern with a unique identifier and all the audio sources with the same source directivity patterns can be pooled by the renderer. In other words the same source directivity pattern identifier can, in some embodiments, be pooled by the renderer.

MPEG-I Audio Phase 2 will normatively standardize the bitstream and the renderer processing. Although there will also be an encoder reference implementation, the encoder implementation can be modified as long as the output bitstream follows the normative specification. This permits codec quality improvements after the standard has been finalized with novel encoder implementations.

In some embodiments, the encoder reference implementation is configured to receive an encoder input format description with one or more sound sources with directivities and room-related parameters. Additionally in some embodiments the encoder is configured to estimate frequency-dependent reverberation gain data based on the sound source directivities. Then the embodiments can be configured to estimate reverberator parameters based on the room-related parameters. Furthermore the embodiments can be configured to write a bitstream description containing the reverberator parameters and frequency-dependent reverberation gain data.

Furthermore in some embodiments the normative bitstream is configured to contain the frequency-dependent reverberation gain data and reverberator parameters described using the syntax described herein. The normative renderer in some embodiments is configured to decode the bitstream to obtain frequency-dependent reverberation gain data and reverberator parameters, initialize processing components for reverberation rendering using the parameters, and perform reverberation rendering using the initialized processing components using the presented method.

Thus in some embodiments, for VR rendering, reverberator parameters are derived in the encoder and sent in the bitstream. For AR rendering, reverberator parameters are derived in the renderer based on a listening space description format (LSDF) file or corresponding representation. The source directivity data in some embodiments is available in the encoder. The embodiments as discussed herein do not rule out implementations where new sound sources are provided directly to the renderer, which would also imply that source directivity data arrives directly to the renderer.

Figure 2:
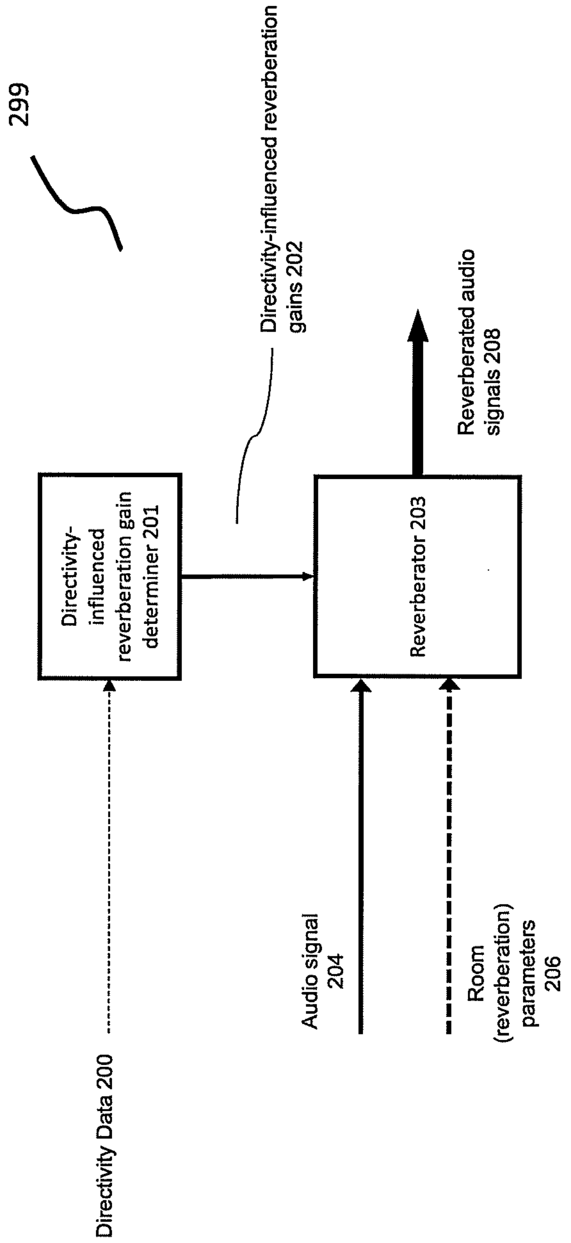
FIG. 2 shows schematically an example apparatus within which some embodiments may be implemented.

With respect to FIG. 2 is shown an example directivity-sensitive reverberator 299 implementation according to some embodiments.

In some embodiments the directivity-influenced reverberator 299 is configured to receive directivity data 200, an audio signal 204, and room parameters 206. Furthermore the directivity-sensitive reverberator 299 is configured to apply a directivity influenced reverberation on the audio signal 204 based on the room parameters 206 and the directivity data 200 and output the directivity-influenced reverberated audio signals or reverberated audio signals where the impact of source directivity has been incorporated (or generally reverberated audio signals) 208. These reverberated audio signals 208 can be for any suitable output format. For example the multichannel output format can be a 7.1+4 channel system format, binaural audio signals and mono audio signals.

The directivity data 200 is forwarded to the directivity-influenced reverberation gain determiner 201. In some embodiments, the directivity data 200 is in the form of gain values $g_{dir}(i, k)$ for a number of directions $\delta(i)$, $\phi(i)$, where i is the index of the data point, k the frequency, $\theta$ the azimuth angle, and $\phi$ the elevation angle. Although optimally, the directions should evenly or uniformly cover the whole sphere around the sound source, the distribution in some embodiments may not be even or uniform or only comprise a few data points.

In some embodiments the directivity-influenced reverberator 299 comprises a directivity-influenced reverberation gain determiner 201. The directivity-influenced reverberation gain determiner is configured to obtain or otherwise receive the directivity data 200 and determine directivity-influenced reverberation gains 202 $g_{dir,rev}(k)$, which describe how the directivity of the sound source affects the magnitude frequency response of the late reverberation. The operation of the directivity-influenced reverberation gain determiner 201 are presented in further detail later on.

The resulting directivity-influenced reverberation gains 202 are forwarded to the reverberator 203.

In some embodiments the directivity-influenced reverberator 299 comprises a reverberator 203. The reverberator is configured to receive the directivity-influenced reverberation gains 202 and also receive the audio signal 204 $s_{in}(t)$ (where t is time) and room parameters 206.

The room parameters can be in various forms. For example in some embodiments the room parameters 206 comprise the energies (typically as diffuse-to-total ratio DDR or reverberant-to-direct ratio RDR) and the reverberation times (typically as RT60) in frequency bands k.

The reverberator 203 is configured to reverberate the audio signal 204 based on the room parameters 206 and the directivity-influenced reverberation gains 202. For example the reverberator comprises a FDN reverberator implementation configured in a manner described in further detail later on.

The resulting directivity-influenced reverberated audio signals 208 $s_{rev}(j, t)$ (where j is the output audio channel index) are output. The output reverberated audio signals may in some embodiments be rendered for a multichannel loudspeaker setup (such as 7.1+4). This reverberation can be based on the room parameters 206 as well as the directivity data 200.

Figure 3:
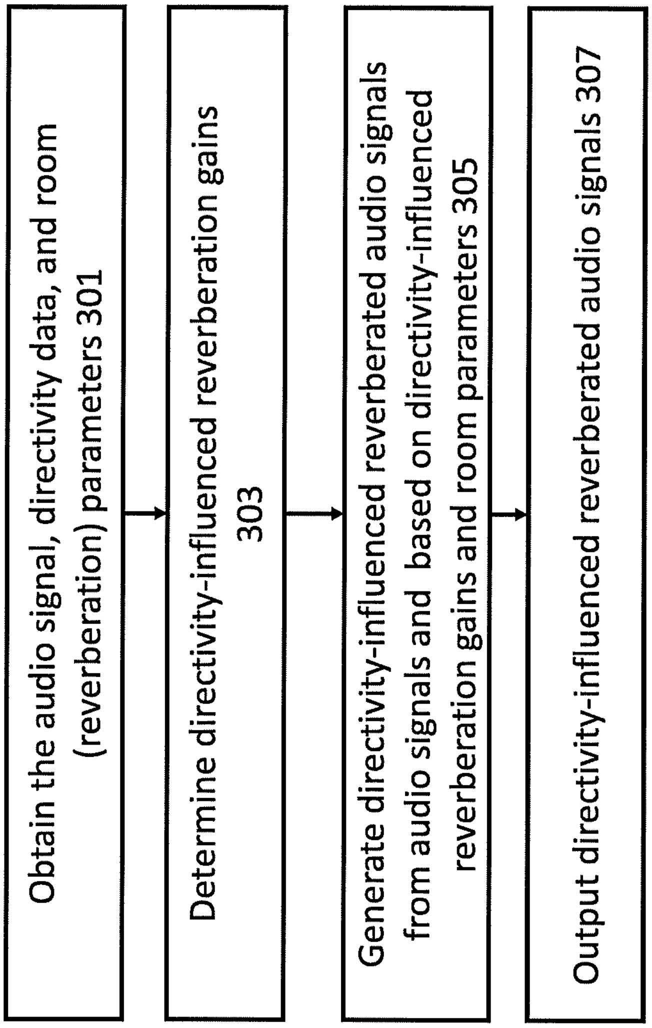
FIG. 3 shows a flow diagram of the operation of the example apparatus as shown in FIG. 2.

With respect to FIG. 3 is shown a flow diagram showing the operations of the example directivity-influenced reverberator 299 shown in FIG. 2.

The first operation can be obtaining the audio signal, directivity data, and room (reverberation) parameters as shown in FIG. 3 by step 301.

Then the directivity-influenced reverberation gains can be determined as shown in FIG. 3 by step 303.

Having determined the directivity-influenced reverberation gains then the directivity-influenced reverberated audio signals are generated from the audio signals and based on the directivity-influenced reverberation gains and room parameters as shown in FIG. 3 by step 305.

Then the directivity-influenced reverberated audio signals are output as shown in FIG. 3 by step 307.

Figure 4:
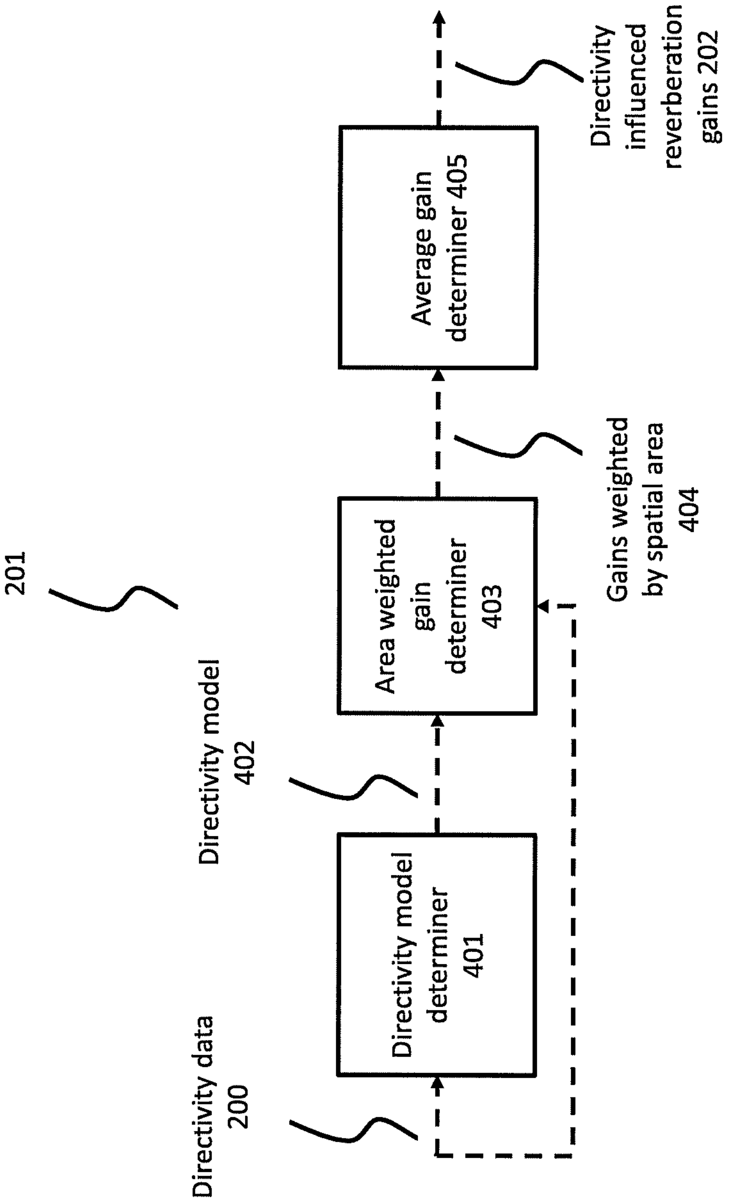
FIG. 4 shows schematically an example directivity-influenced reverberation gain determiner as shown in FIG. 2 according to some embodiments.

FIG. 4 shows in further detail the directivity-influenced reverberation gain determiner 201 according to some embodiments. In some embodiments the directivity-influenced reverberation gain determiner 201 is configured to receive directivity data 200. The directivity data 200 in some embodiments comprises gains $g_{dir}(i, k)$ for directions $\theta(i)$, $\phi(i)$.

In some embodiments the directivity-influenced reverberation gain determiner 201 comprises a directivity model determiner 401. The directivity model determiner 401 is configured to analyse the input directivity data 200 to determine whether the data is three- or two-dimensional. This can be implemented by analyzing the axes of the array consisting of the $p(i)=[x(i),y(i), z(i)]^T$ cartesian points of the gains in all directions i, which is provided by the directivity data 200. If none of the three axes are all zeros, it means that the directivity data 200 has three dimensions (3D) and the directivity model is thus three dimensional. In a case where one of the axes is all zeros the directivity data contains data provided in two dimensions (2D) and the directivity model is two dimensional. The resulting directivity model 402 information in some embodiments is forwarded to an (spatial) area weighted gain determiner 403. Area weighted gains can also be referred as gain data.

In some embodiments the directivity-influenced reverberation gain determiner 201 comprises an area weighted gain determiner 403. The area weighted gain determiner 403 is configured to receive the directivity model 402 information and divides the total area, such as a sphere (for the 3D model) or a plane (for the 2D model) into subareas. The area weighted gain determiner 403 is configured to further receive the directivity data 200 and assign the directivity data to subareas corresponding to provided directivity values.

In some embodiments for a three-dimensional (3D) directivity model, a spherical Voronoi cover is formed from the cartesian points p(i) of gains in all directions. The Voronoi cover partitions the sphere into regions close to each of the points p(i).

For each gain squared, an area weighted magnitude is calculated by $$g_{dir,area}(i,k)^2=\text{voronoiCellArea}(i)*(g_{dir}(i,k)^2)$$

where voronoiCellArea(i) is the area of the region (Voronoi cell) close to p(i).

In some embodiments the total area is calculated by summing all the Voronoi cell areas:

$$\text{totalArea}=\Sigma_i\text{voronoiCellArea}(i)$$

In some embodiments for a two-dimensional (2D) directivity model, the planar area's centroid's Cartesian coordinates are calculated by $$c[0]=\Sigma_i x(i)/n\text{OfPoints}$$

$$c[1]=\Sigma_i y(i)/n\text{OfPoints}$$

where x(i)=first column of first nonzero cartesian elements y(i)=second column of second nonzero cartesian elements.

In the above example the nonzero cartesian elements are denoted as x and y meaning that z was all zeros. However, this does not need to be the case but the method shown herein always obtains the two axes of nonzero elements regardless of which ones of x, y, and z they are.

After the centroid is calculated, for each point p(i) a triangle is formed from the vertices p0=p̌(i), p1=p̌(i+1), and c and corresponding triangle sides are calculated:

$$p0p1(i)=\text{sqrt}((p1[0]-p0[0])\hat{}2)+(p1[1]-p0[1])\hat{}2))$$

$$p1c(i)=\text{sqrt}((c[0]-p1[0])\hat{}2)+(c[1]-p1[1])\hat{}2))$$

$$cp1(i)=\text{sqrt}((p1[0]-c[0])\hat{}2)+(p1[1]-c[1])\hat{}2))$$

p̌(i) is formed from the point p(i) by including the two nonzero cartesian coordinates.

The triangle area can then in some embodiments be calculated as:

$$\text{triangleArea}(i)=(p0p1(i)+p1c(i)+cp1(i))/2$$

$$\text{totalArea}=\Sigma_i\text{triangleArea}(i)$$

For each gain squared, area weighted magnitude is calculated by $$g_{dir,area}(i,k)^2=\text{triangleArea}(i)*(g_{dir}(i,k)^2)$$

Since the two-dimensional directivity model might not always be circular, this example shows a method which can be used as a generic approach for getting the estimated area from the directivity data 200 of any two-dimensional shape.

An alternative for obtaining estimated areas for a two-dimensional shaped would be to use, instead of triangle areas, the arc lengths, i.e., the angles in radians, from each midpoint (on the circle) between every two directivity samples, to the next one midpoint.

The resulting gains weighted by spatial area (or area weighted gains) 404 $g_{dir,area}(i, k)^2$ can then be forwarded to an average gain determiner 405.

In some embodiments the directivity-influenced reverberation gain determiner 201 comprises an average gain determiner 405. The average gain determiner 405 is configured to receive the gains weighted by spatial area and determine directivity-influenced reverberation gains 202. In some embodiments the directivity-influenced reverberation gains can be determined by computing the average of the gains weighted by spatial area. For example in some embodiments the directivity influenced reverberation gains 202 are determined by $$g_{dir,rev}(k) = \sqrt{\frac{\sum_k g_{dir,area}(i, k)^2}{\text{totalArea}}}$$

The directivity-influenced reverberation gains $g_{dir,rev}(k)$ 202 in some embodiments are the output. The directivity-influenced reverberation gains $g_{dir,rev}(k)$ can also be referred as averaged gains as they are spatially averaged over the (spatial) directions θ(i) ϕ(i) where the original gain data $g_{dir}(i, k)$ was provided. Note that averaged gain data $g_{dir,rev}(k)$ no longer depends on the directions but is dependent on the frequency k.

The averaged gain data $g_{dir,rev}(k)$ can be represented and encoded into a bitstream as is, using the original frequencies k. Alternatively, the averaged gain data can be converted into decibels by calculating 20*log 10($g_{dir,rev}(k)$). Alternatively or in addition to, the averaged gain data can be represented at some other frequency resolution such as at octave or third octave frequencies. As a yet another alternative the averaged gain data can be represented with the coefficients of a graphic equalizer filter comprising the coefficients of a cascade filterbank of second-order section IIR filters. Such a filter bank can be designed such that its magnitude response is similar to the input command gains in decibels, which can be set equal to 20*log 10($g_{dir,rev}(b)$), where $g_{dir,rev}(b)$ are the averaged gains evaluated at the filterbank center frequencies, such as octave center frequencies.

Figure 5:
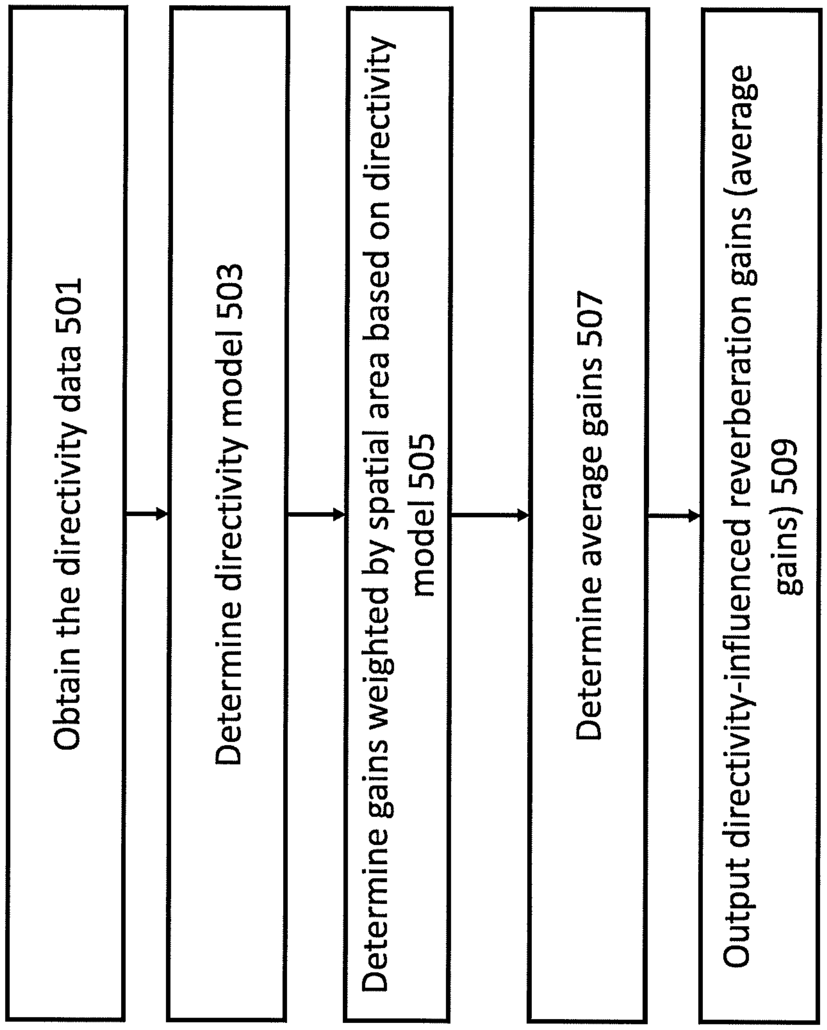
FIG. 5 shows a flow diagram of the operation of the example directivity-influenced reverberation gain determiner as shown in FIG. 4.

With respect to FIG. 5 a flow diagram shows the operations of the example directivity-influenced reverberation gain determiner 201 as shown in FIG. 4.

The first operation is that of obtaining the directivity data as shown in FIG. 5 by step 501.

Having obtained the directivity data then this is used to determine the directivity model as shown in FIG. 5 by step 503.

Then gains weighed by the spatial area based on the determined directivity model and the directivity data is determined as shown in FIG. 5 by step 505.

Having determined gains weighed by the spatial area then the average gains are determined as shown in FIG. 5 by step 507.

Then the directivity-influenced reverberation gains (the average gains) are output as shown in FIG. 5 by step 509.

Figure 6:
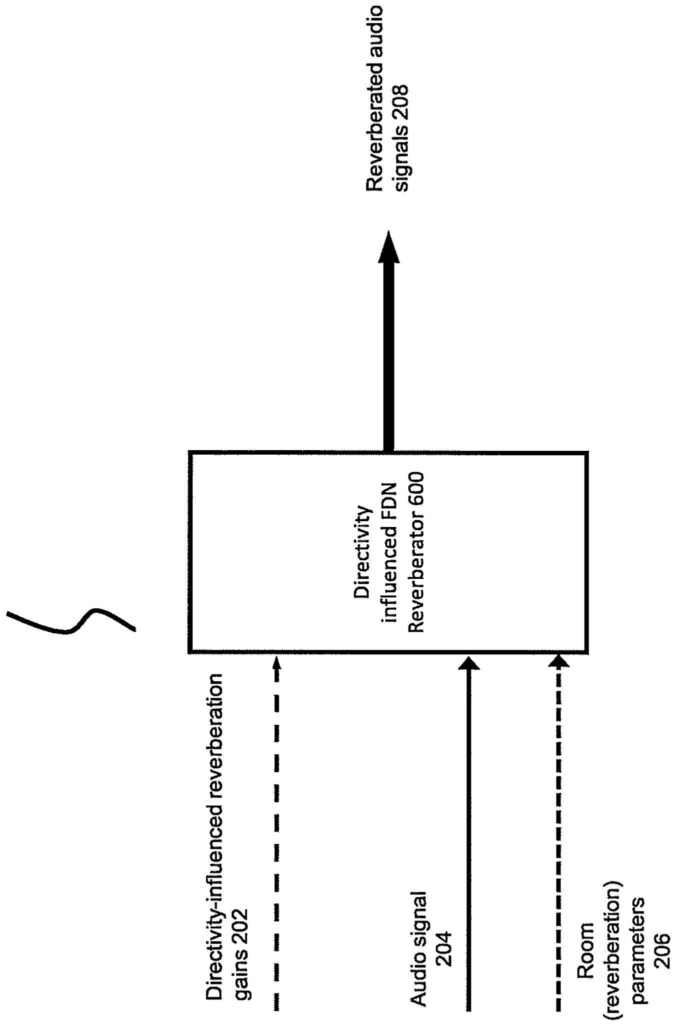
FIG. 6 shows schematically an example reverberator as shown in FIG. 2 according to some embodiments.

With respect to FIG. 6 is shown an example reverberator 203 according to some embodiments. The reverberator 203 can be implemented as any suitable directivity-influenced digital reverberator 600 which is enabled or configured to produce reverberation whose characteristics match the room parameters. An example reverberator implementation comprises a feedback delay network (FDN) reverberator and directivity-influenced filter which enables reproducing reverberation having desired frequency dependent RT60 times and levels and directivity-influenced filtering. The room parameters 206 are used to adjust the FDN reverberator parameters such that it produces the desired RT60 times and levels. An example of a level parameter can the direct-to-diffuse-ratio (DDR) (or the diffuse-to-total energy ratio as used in MPEG-1). The directivity-influenced reverberation gains 202 are input to the Reverberator and applied to the input or output of the reverberator such that the reverberation spectrum (level) is appropriately adjusted depending on the source directivity. The input to the directivity-influenced FDN reverberator 600 is the audio signal 204 which can be a monophonic input or multichannel input or Ambisonics input. The output from the directivity-influenced FDN reverberator 600 are the directivity-influenced reverberated audio signals 208 which for binaural headphone reproduction are then reproduced into two output signals and for loudspeaker output means typically more than two output audio signals. Reproducing several outputs such as 15 FDN delay line outputs to binaural output can be done, for example, via HRTF filtering.

Figure 7:
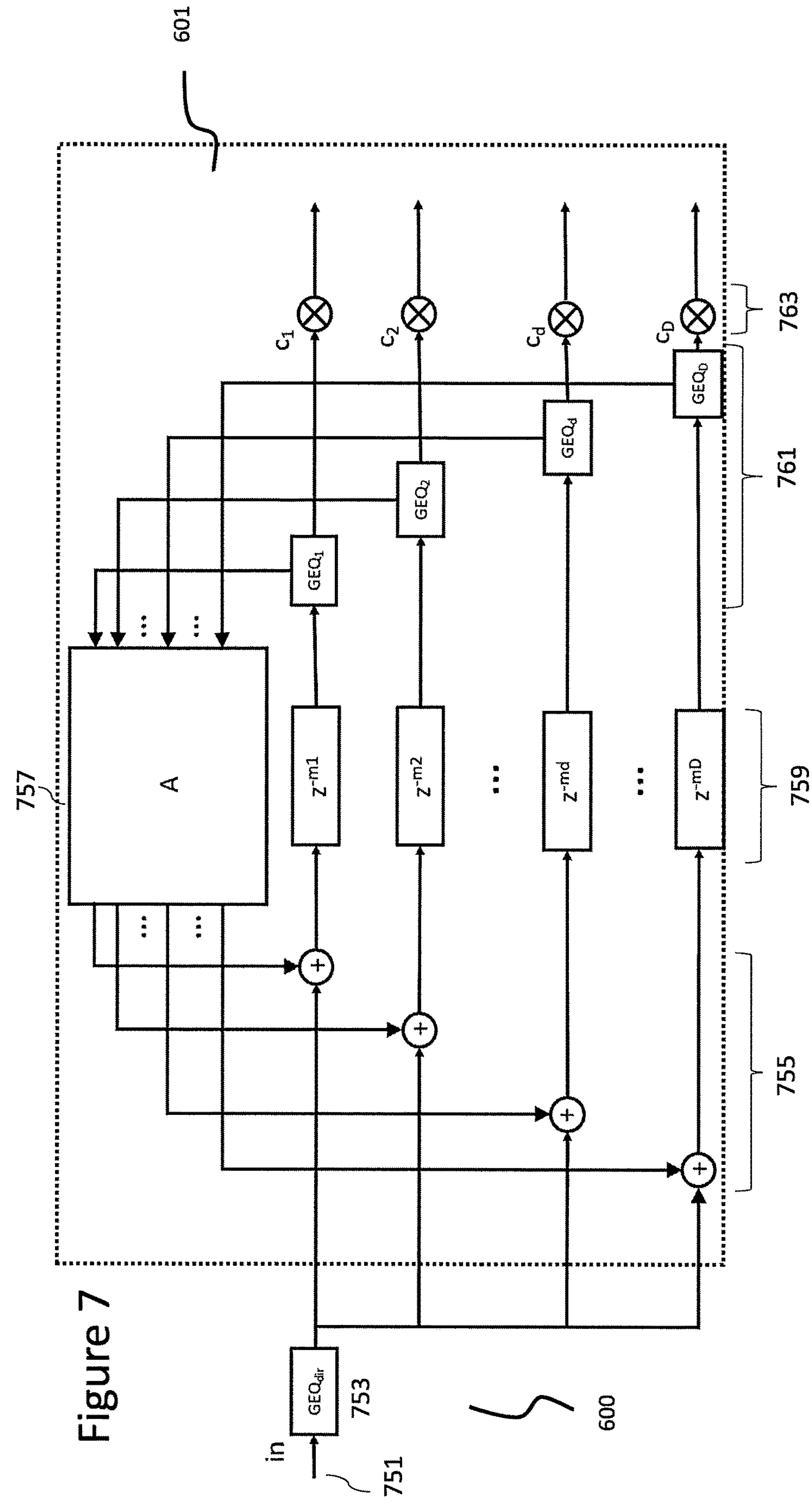
FIG. 7 shows schematically an example FDN reverberator as shown in FIGS. 2 and 6 according to some embodiments.

FIG. 7 shows an example directivity-influenced FDN reverberator 600 in further detail and which can be used to produce D uncorrelated output audio signals. In this example each output signal can be rendered at a certain spatial position around the listener for an enveloping reverb perception.

The example directivity-influenced FDN-reverberator 600 implementation comprises a FDN reverberator 601 which is configured such that the reverberation parameters are processed to generate coefficients $GEQ_d$ ($GEQ_1$, $GEQ_2$, . . . $GEQ_D$) of each attenuation filter 761, feedback matrix 757 coefficients A, lengths $m_d$ ($m_1$, $m_2$, . . . $m_D$) for D delay lines 759 and directivity-based reverberation filter 753 coefficients $GEQ_{dir}$. The example FDN reverberator 601 thus shows a D-channel output, by providing the output from each FDN delay line as a separate output. The example directivity-influenced FDN reverberator 600 in FIG. 7 further comprises a single directivity-influenced filter $GEQ_{dir}$ 753 but in some embodiments there are several such directivity-influenced filters.

In some embodiments each attenuation filter $GEQ_d$ 761 is implemented as a graphic EQ filter using M biquad IIR band filters. With octave bands M=10, thus, the parameters of each graphic EQ comprise the feedforward and feedback coefficients for biquad IIR filters, the gains for biquad band filters, and the overall gain. In some embodiments any suitable manner may be implemented to determine the FDN reverberator parameters, for example the method described in GB patent application GB2101657.1 can be implemented for deriving FDN reverberator parameters such that the desired RT60 time for the virtual/physical scene can be reproduced.

The reverberator uses a network of delays 759, feedback elements (shown as attenuation filters 761, feedback matrix 757 and combiners 755 and output gain 763) to generate a very dense impulse response for the late part. Input samples 751 are input to the reverberator to produce the reverberation audio signal component which can then be output.

The FDN reverberator comprises multiple recirculating delay lines. The unitary matrix A 757 is used to control the recirculation in the network. Attenuation filters 761 which may be implemented in some embodiments as graphic EQ filters implemented as cascades of second-order-section IIR filters can facilitate controlling the energy decay rate at different frequencies. The filters 761 are designed such that they attenuate the desired amount in decibels at each pulse pass through the delay line and such that the desired RT60 time is obtained. Thus the input to the encoder can provide the desired RT60 times per specified frequencies f denoted as RT60(f). For a frequency f, the desired attenuation per signal sample is calculated as attenuationPerSample(f)=−60/(samplingRate*RT60(f)). The attenuation in decibels for a delay line of length $m_d$ is then attenuationDb(f)= $m_d$*attenuationPerSample(f).

The attenuation filters are designed as cascade graphic equalizer filters as described in V. Välimäki and J. Liski, "Accurate cascade graphic equalizer," IEEE Signal Process. Lett., vol. 24, no. 2, pp. 176-180, February 2017 for each delay line. The design procedure outlined in the paper referenced above takes as an input a set of command gains at octave bands. There are also methods for a similar graphic EQ structure which can support third octave bands, increasing the number of biquad filters to 31 and providing better match for detailed target responses as described in Third-Octave and Bark Graphic-Equalizer Design with Symmetric Band Filters, https://www.mdpi.com/2076-3417/10/4/1222/pdf.

Furthermore in some embodiments the design procedure of V. Välimäki and J. Liski, "Accurate cascade graphic equalizer," IEEE Signal Process. Lett., vol. 24, no. 2, pp. 176-180, February 2017 is also used to design the parameters for the reverb directivity filters $GEQ_{dir}$. The input to the design procedure are the directivity-influenced reverberation gains 202 in decibels.

The parameters of the FDN reverberator 601 can be adjusted so that it produces reverberation having characteristics matching the input room parameters. For this reverberator 601 the parameters contain the coefficients of each attenuation filter $GEQ_d$, 761, feedback matrix coefficients A 757, lengths $m_d$ for D delay lines 759, and spatial positions for the delay lines d.

In addition, directivity gain filter 753 $GEQ_{dir}$ coefficients are obtained based on the directivity-influenced reverberation gains 202. In this invention, each attenuation filter $GEQ_d$ and the directivity gain filter $GEQ_{dir}$ is a graphic EQ filter using M biquad IIR band filters. Note that there are as many directivity gain filters $GEQ_{dir}$ as there are unique directivity patterns for the input signals. Note that in embodiments the number of biquad filters in the different graphic EQ filters can vary and does not need to be the same in the delay line attenuation filters and the directivity-influenced reverberation gain filter.

The number of delay lines D can be adjusted depending on quality requirements and the desired tradeoff between reverberation quality and computational complexity. In an embodiment, an efficient implementation with D=15 delay lines is used. This makes it possible to define the feedback matrix coefficients A as proposed by Rocchesso: Maximally Diffusive Yet Efficient Feedback Delay Networks for Artificial Reverberation, IEEE Signal Processing Letters, Vol. 4. No. 9, September 1997 in terms of a Galois sequence facilitating efficient implementation.

A length $m_d$ for the delay line d can be determined based on virtual room dimensions. For example, a shoebox (or cuboid) shaped room can be defined with dimensions xDim, yDim, zDim. If the room is not cuboid shaped (or shaped as a shoebox) then a shoebox or cuboid can be fitted inside the room and the dimensions of the fitted shoebox can be utilized for the delay line lengths. Alternatively, the dimensions can be obtained as three longest dimensions in the non-shoebox shaped room, or other suitable method.

The delays can in some embodiments can be set proportionally to standing wave resonance frequencies in the virtual room or physical room. The delay line lengths $m_d$ can further be configured as being mutually prime in some embodiments.

Figure 8:
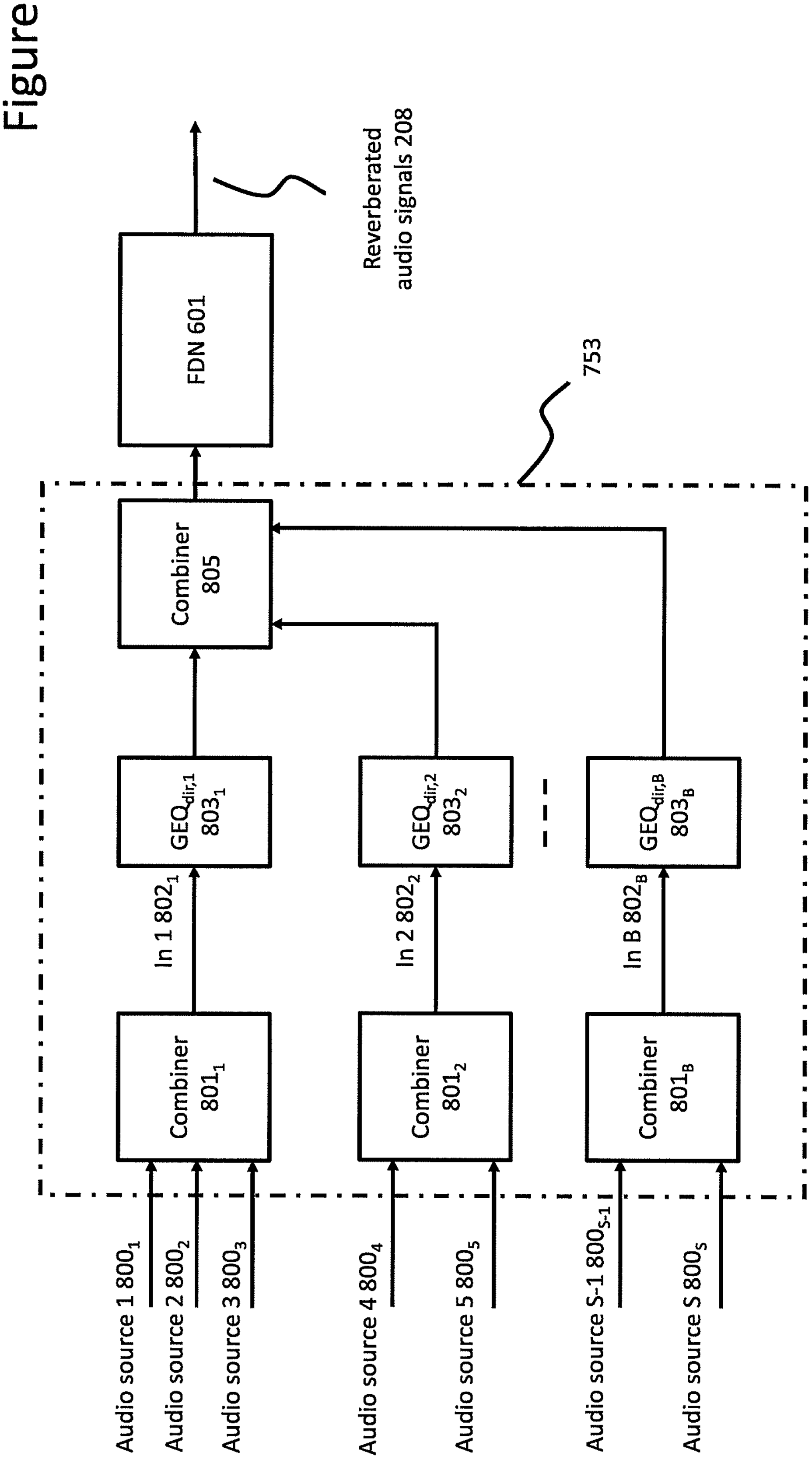
FIG. 8 shows schematically an example FDN reverberator with directivity buses having directivity gain filters as shown in FIG. 6 according to some embodiments.

FIG. 8 depicts schematically in further detail the directivity-influenced filter 753 according to some embodiments. The aim of this example is to group together sources which have the same or similar directivity patterns so that there can be number of B directivity buses less than the number of sources S. A simple grouping will combine together sources which share the same directivity pattern because they have the same directivity-influenced reverberation gains 202. Furthermore, in some embodiments B can be less than the number of distinct directivity patterns for the S sources. In this case the grouping method combines together sources which have directivity-influenced reverberation gains close to each other. In some embodiments closeness can be defined as the average absolute difference in decibels of the directivity-influenced reverberation gains or with other suitable metric such as log spectral distortion of the average directivity patterns.

The criterion of closeness can depend on the available computing capacity and the number of sources. Thus, as the computational capacity becomes less the threshold for combining two sources with close directivity pattern can be increased. As the number of sound sources increases the threshold for combining two sound sources with close directivity patterns can be increased.

Thus, as shown in FIG. 8, there is shown a first set of combiners which receive inputs of the audio sources. For example there is shown a first set of sources comprising audio source 1 $\mathbf{800}_1$, audio source 2 $\mathbf{800}_2$ and audio source 3 $\mathbf{800}_3$ which are input to a first combiner $\mathbf{801}_1$ (as sources 1, 2 and 3 have directivity patterns have a similar or same directivity-influenced reverberation gains). Additionally is shown a second set of sources comprising audio source 4 $\mathbf{800}_4$, and audio source 5 $\mathbf{800}_5$ which are input to a second combiner $\mathbf{801}_2$ (as sources 4 and 5 have directivity patterns have a similar or same directivity-influenced reverberation gains). Furthermore is shown a B'th set of sources comprising audio source S-1 $\mathbf{800}_{S-1}$ and audio source S $\mathbf{800}_S$ which are input to a B'th combiner 801B (as sources S-1 and S have directivity patterns have a similar or same directivity-influenced reverberation gains).

Then each combiner 801 output forms the input for a directivity-influenced filter. Thus the first group directivity-influenced filter $GEQ_{dir,1}$ $\mathbf{803}_1$ has an input of in 1 $\mathbf{802}_1$, the second group directivity-influenced filter $GEQ_{dir,2}$ $\mathbf{803}_2$ has an input of in 2 $\mathbf{802}_2$ and the B'th group directivity-influenced filter $GEQ_{dir,B}$ $\mathbf{803}_B$ has an input of in B $\mathbf{802}_B$.

The output of each group directivity-influenced filter 803 is then passed to a combiner 805.

The directivity-influenced filter 753 can furthermore comprise the combiner 805 which receives the outputs of the group directivity-influenced filters and then combines these to generate the input to the FDN reverberator 601.

Figure 9:
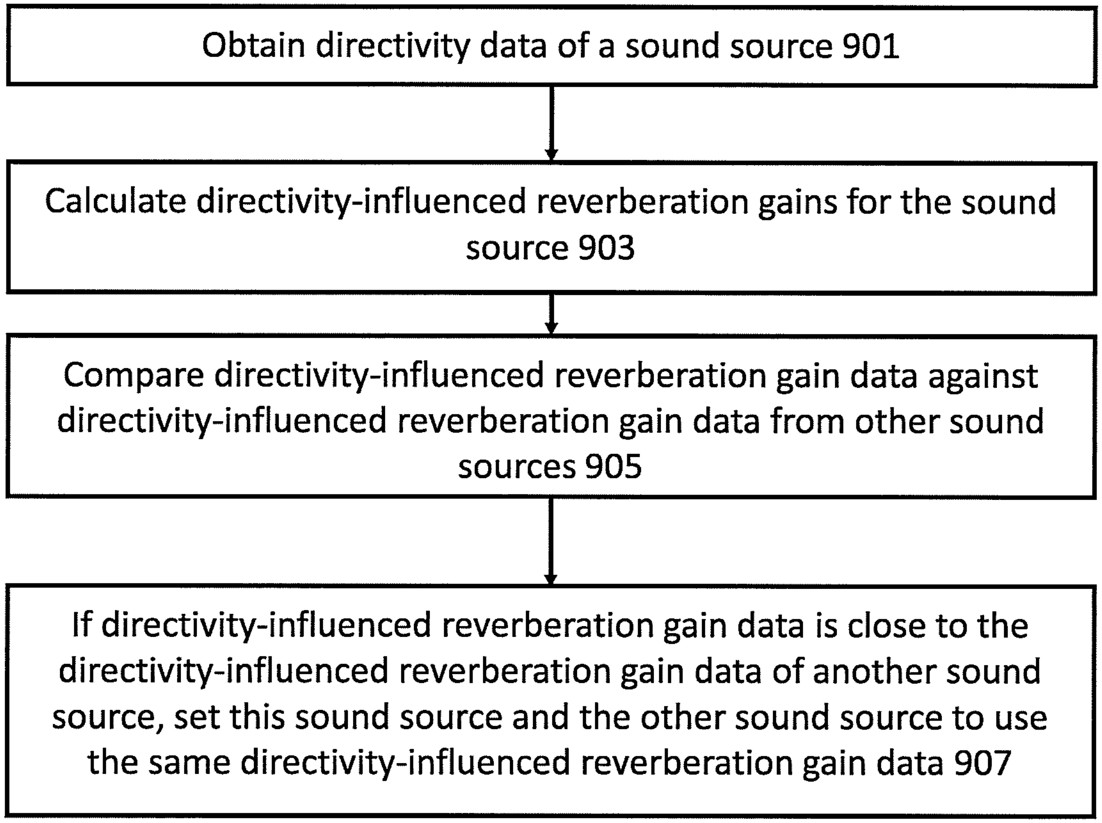
FIG. 9 shows a flow diagram of the operation of the FDN reverberator with directivity buses having directivity gain filters as shown in FIG. 8.

With respect to FIG. 9 is shown a flow diagram showing the operations of the configuration of the directivity-influenced filter 753/FDN 601 as shown in FIGS. 7 and 8.

For example the first operation is one of obtaining the directivity data of a sound source as shown in FIG. 9 by step 901.

Then the directivity-influenced reverberation gains for the sound source are calculated or determined as shown in FIG. 9 by step 903.

The directivity-influenced reverberation gains for sound sources are then compared against each other as shown in FIG. 9 by step 905.

Then if directivity-influenced reverberation gain data is close to the directivity-influenced reverberation gain data of another sound source, then group this sound source and the other sound source in order that they both are configured to use the same directivity-influenced reverberation gain data as shown in FIG. 9 by step 907.

Figure 10:
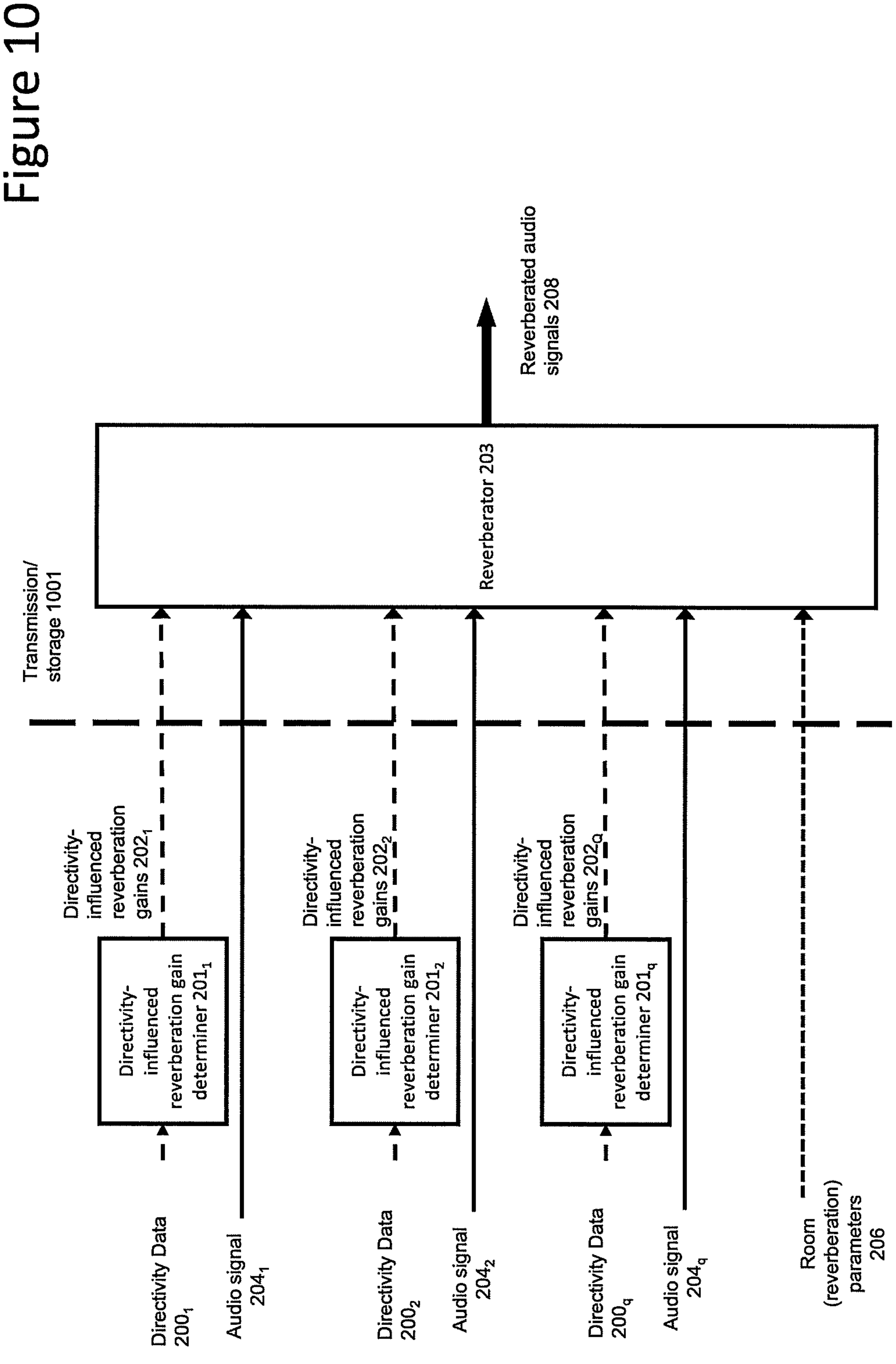
FIG. 10 shows schematically an example apparatus with transmission and/or storage within which some embodiments can be implemented.

FIG. 10 shows schematically apparatus which depicts an example implementation where an encoder device is configured to implement some of the functionality of the reverberator. For example as shown in FIG. 10 the encoder is configured to generate the directivity-influenced reverberation gains and writes this information into a bitstream together with the audio signal and room parameters and transmits to the renderer (and/or stores this information for later consumption).

In this example embodiment, there are three sound sources as an input. Thus there is a first sound source with directivity data $\mathbf{200}_1$ and audio signals $\mathbf{204}_1$ a second sound source with directivity data $\mathbf{200}_2$ and audio signals $\mathbf{204}_2$ and a third (q'th) sound source with directivity data $\mathbf{200}_q$ and audio signals $\mathbf{204}_q$. However, there could be any number of sound sources as an input. Each sound source directivity data is passed to an associated directivity-influenced reverberation gain determiner (for example a first directivity-influenced reverberation gain determiner $\mathbf{201}_1$ associated with the first audio source (directivity-data $\mathbf{200}_1$), a second directivity-influenced reverberation gain determiner $\mathbf{201}_2$ associated with the second audio source (directivity-data $\mathbf{200}_2$), and a q'th directivity-influenced reverberation gain determiner $\mathbf{201}_q$ associated with the q'th audio source (directivity-data $\mathbf{200}_q$).

Each directivity-influenced reverberation gain determiner $\mathbf{201}_1$, $\mathbf{201}_2$, and $\mathbf{201}_q$ is configured to output an associated set of directivity-influenced reverberation gains $\mathbf{202}_1$, $\mathbf{202}_2$, and $\mathbf{202}_q$ which can be encoded/quantized and combined into a bitstream with the associated audio signals $\mathbf{204}_1$, $\mathbf{204}_2$, and $\mathbf{204}_q$ and the room parameters 206 which can then be passed to the reverberator 203.

In some embodiments the conversion from room parameters to reverberator parameters is done by the encoder device and in this case the reverberator parameters are signaled from the encoder to the renderer.

In some embodiments the "Room parameters" mapped into digital reverberator parameters with directivity-influenced filter $GEQ_{dir,j}$ filter parameters are described in the following bitstream definition.

| AUDIO OBJECTS METADATA | Number of bits | Mnemonic |
|---|---|---|
| AudioObjectsStruct(){ | | |
| numberOfAudioObjects; | 8 | uimsbf |
| for(int i=0;i<numberOfAudioObjects;i++){ | | |
| id; | 16 | uimsbf |
| LocationStruct(); | | |
| active; | 1 | bslbf |
| gainDb; | 32 | tcimsbf |
| directivityPresentFlag; | 1 | bslbf |
| paddingBits; | 7 | uimsbf |
| if(directivitiesPresent){ | | |
| directivityId; | 16 | uimsbf |
| } | | |
| } | | |

The AudioObjectsStruct( ) example described above can be summarised as follows:

numberOfAudioObjects defines the number of audio objects in the audio scene.

id identifies an audio object uniquely in the audio scene.

directivityPresentFlag equal to 1 indicates that the audio object has a directivity associated with it.

directivityId is the directivity profile description identifier for each of the audio object, if directivityPresentFlag is equal to 1. Each of the directivity files present in the audio scene description has a unique directivityId.

LocationStruct( ) provides information about the position of the audio object in the audio scene. This can be provided with suitable coordinate system (e.g., cartesian, polar, etc.). This data structure can also carry the audio object orientation information, which may be of greater relevance for audio objects which are not omnidirectional point sources.

| AUDIO CHANNELS METADATA | Number of bits | Mnemonic |
|---|---|---|
| AudioChannelSourcesStruct(){ | | |
| numberOfAudioChannelSources; | 8 | uimsbf |
| for(int i=0;i<numberOfAudioChannelSources;i++){ | | |
| id; | 16 | uimsbf |
| numberOfLoudspeakers; | 8 | uimsbf |
| for(int i=0;i<numberOfLoudspeakers;i++){ | | |
| positionX; | 32 | tcimsbf |
| positionY; | 32 | tcimsbf |
| positionZ; | 32 | tcimsbf |
| orientationYaw; | 32 | tcimsbf |
| orientationPitch; | 32 | tcimsbf |
| orientationRoll; | 32 | tcimsbf |
| channel_index; | 7 | uimsbf |
| directivityPresentFlag; | 1 | bslbf |
| if(directivitiesPresentFlag){ | | |
| directivityId; | 16 | uimsbf |
| directiveness; | 32 | tcimsbf |
| } | | |
| signlId; | 8 | uimsbf |
| active; | 1 | bslbf |
| inputLayout; | 7 | uimsbf |
| } | | |
| } | | |

The AudioChannelSourcesStruct( ) example described above can be summarised as follows:

numberOfAudioChannelSources defines the number of channel sources in the audio scene.

numberOfLoudspeakers defines the number of loudspeakers in a particular channel source.

id defines the channel source with a unique identifier.

channel_index defines the index of each of the channels in a given channel source.

directivityPresentFlag equal to 1 indicates that the channel has a directivity associated with it.

directivityId is the directivity profile description identifier for the channel in the channel source which has a directivityPresentFlag equal to 1. This identifier is unique to each of the directivity files present in the audio scene description.

| REVERB METADATA | Number of bits | Mnemonic |
|---|---|---|
| reverbPayloadStruct(){ | | |
| numberOfSpatialPositions; | 2 | bslbf |
| for(int i=0;i<numberOfSpatialPositions;i++){ | | |
| azimuth; | 9 | tcimsbf |
| elevation; | 9 | tcimsbf |
| } | | |
| numberOfAcousticEnvironments; | 8 | uimsbf |
| for(int i=0;i<numberOfAcousticEnvironments;i++){ | | |
| environmentsId; | 16 | tcimsbf |
| filterParamsStruct(); | | |
| for(int j=0;j<numberOfSpatialPositions;j++){ | | |
| delayLineLength; | 32 | uimsbf |
| filterParamsStruct(); | | |
| } | | |
| directivitiesPresent; | 1 | bslbf |
| paddingBits; | 7 | uimsbf |
| if(directivitiesPresent){ | | |
| numberOfDirectivities; | 8 | uimsbf |
| for(int i=0;i<numberOfDirectivities;i++){ | | |
| reverbDirectivityGainFilterId; | 8...* | bslbf |
| filterParamsStruct(); | | |
| } | | |
| } | | |
| } | | |

The reverbPayloadStruct( ) example described above can be summarised as follows:

numberOfSpatialPositions defines the number of output delay line positions for the late reverberation payload. This value is defined using an index which corresponds to a specific number of delay lines. The value of the bit string '0b00' signals the renderer to a value of 15 spatial orientations for delay lines. The other three values '0b01', '0b10' and '0b11' are reserved.

azimuth defines azimuth of the delay line with respect to the listener. The range is between −180 to 180 degrees.

elevation defines the elevation of the delay line with respect to the listener. The range is between −90 to 90 degrees.

numberOfAcousticEnvironments defines the number of acoustic environments in the audio scene. The reverbPayloadStruct( ) carries information regarding the one or more acoustic environments which are present in the audio scene at that time. An acoustic environment has certain "Room parameters" such as RT60 times which are used to obtain FDN reverb parameters.

environmentId This value defines the unique identifier of the acoustic environment.

delayLineLength defines the length in units of samples for the graphic equalizer (GEQ) filter used for configuration of the delay line attenuation filter. The lengths of different delay lines corresponding to the same acoustic environment are mutually prime.

filterParamsStruct( ) this structure describes the graphic equalizer cascade filter to configure the attenuation filter for the delay lines. The same structure is also used subsequently to configure the filter for diffuse-to-direct reverberation ratio and reverberation source directivity gains. The details of this structure are described in the next table.

The source directivity handling example described above can be summarised as follows:

directivitiesPresent equal to 1 indicates the presence of audio elements with source directivity in the acoustic environment. If the value is equal to 0, source directivity handling metadata can be absent in the late reverb metadata.

numberOfDirectivities indicates the number of source directivities present in the particular acoustic environment. A directivity can be applicable to one or more audio elements in the acoustic environment.

In some embodiments, the directivitiesPresent flag and related checks may be skipped. The directivity handling metadata can be directly present.

The filterParamsStruct( ) example described above can be summarised as follows:

SOSLength is the length of the each of the second order section filter coefficients.

b1, b2, a1, a2 The filter is configured with coefficients b1, b2, a1 and a2. These are the feedforward and feedback IIR filter coefficients of the second-order section IIR filters.

globalGain specifies the gain factor in decibels for the GEQ.

levelDB specifies a sound level offset for each of the delay lines in decibels.

The association between the source directivity profiles and the reverberation payload directivity handling metadata in some embodiments is performed by the renderer/decoder. This can in some embodiments be implemented by first checking the relevant audio sources for a particular acoustic environment (e.g., contained within the acoustic environment extent). The relevant audio sources feeding the reverb are checked for the presence of source directivity information (e.g., numberOfDirectivities is greater than 0 and directivitiesPresentFlag is equal to 1). Subsequently, the reverberation metadata is checked for the presence of the corresponding reverbDirectivityGainFilterId. Subsequently, the relevant source directivity filtering is applied before feeding the audio for late reverb rendering.

As can be seen above the AudioChannelSourcesStruct and the AudioObjectsStruct carry directivityId whereas the reverb metadata payload carries the reverbDirectivityGainFilterId. In some embodiments, the directivityId and the reverbDirectivityGainFilterId can be the same. In such scenarios the number of directivityIds in the audio scene corresponding to audio elements in a particular acoustic environment shall be equal to the numberOfDirectivities in the reverb payload metadata. In other embodiments there can be a fewer number of reverbDirectivityGainFilterId corresponding to fewer GEQs for performing source directivity related filtering, if some of the directivities in the audio scene description (represented by the unique directivityId) are determined to be more than a threshold similar or equivalent and can therefore be clustered or combined using the method depicted in FIG. 9. Such a clustering of multiple directivityId in the audio scene to fewer reverbDirectivityGainFilterIds can be exploited by the renderer to obtain higher computational efficiency as depicted in the embodiment of FIG. 8.

An additional data structure can be carried in the bitstream to indicate such a mapping of multiple directivityId to a single reverbDirectivityGainFilterId. In such a situation the clustering to obtain fewer reverbDirectivityGainFilterId can be performed by the encoder and the information included in the bitstream. In another implementation embodiment such a remapping can also be implemented by the renderer after performing its own analysis to combine multiple directivityId to a fewer number of reverbDirectivityGainFilterId.

```
aligned(8) reverbDirectivityGainFilterMappingStruct{
  unsigned int(8) numReverbDirectivityGainFilters;
  for(i=0;i<numReverbDirectivityGainFilters;i++){
    unsigned int(16) reverbDirectivityGainFilterId;
    unsigned int(8) numDirectivityIds;
    for(i=0;i<numDirectivityIds;i++){
      unsigned int(16) directivityId;
    }
  }
}
```

The reverbDirectivityGainFilterMappingStruct( ) example described above can be summarised as follows:

numReverbDirectivityGainFilters is the number of directivity gain filters in the reverb metadata.

reverbDirectivityGainFilterId specifies the GEQ filter identifier for source directivity gain control for reverb.

numDirectivityIds specifies the number of source directivityId mapped to a single reverbDirectivityGainFilterId.

The following shows an example of metadata which can be provided by the encoder to assist the renderer to choose between rendering each directivityId versus combining multiple directivities with a single reverb directivity gain filter (GEQ) specified by a single reverbDirectivityGainFilterId based on the audio scene and computational workload. Thus such a feature provides the flexibility to the renderer for run time decisions.

```
aligned(8) reverbDirectivitySimilarityStruct{
  unsigned int(8) numDirectivityIds;
  for(i=0;i<numDirectivityIds;i++){
    unsigned int(16) directivityId;
    for(i=0;i<numDirectivityIds;i++){
      unsigned int(16) directivityId;
      unsigned int(8) similarity_index;
    }
  }
}
```

The reverbDirectivitySimilarityStruct( ) example described above can be summarised as follows:

numDirectivityIds is the number of directivities for which similarity data is present.

directivityId is the identifier for source directivity specified in the audio scene description for one or more audio elements.

similarity_index specifies a number describing the characteristics of the directivity profile specified by the corresponding directivityId. This can be derived based on a value derived with a suitable similarity metric. One such example can be the difference in gain being less than a predefined threshold for the different frequency bins. The smaller the threshold the greater is the similarity index. So the same directivity shall have similarity_index equal to 255 and the most dissimilar will have the similarity_index equal to 0. Other similarity_index measurement methods can be derived based on application requirements. In an embodiment, the similarity_index can be a result of the step 905 in FIG. 9.

In some embodiments, there can be a determination or check whether a sound source has a directivity-influenced filter or not is performed when a reverberator instance is initialized, and sources which have a directivity-influenced filter will receive a valid pointer to a directivity-influenced filter instance and sources without a directivity-influenced filter will receive a null pointer as their directivity-influenced filter instance pointer.

In some embodiments all filterParamsStruct( ) get deserialized into a GEQ object in the renderer and association between directivity and GEQ is formed. The renderer associates each audio objects directivity model with corresponding GEQ which is used to apply filtering to each audio item.

In some embodiments the implementation of the reverberation directivity gain filtering in the renderer can be performed as follows:

Initialize directivity filters for the buses B. Input signals which have a directivity gain filter have a pointer to a directivity filter. Each directivity gain filter has an input bus. Also the digital reverberator has an input bus.

At each rendering loop through input audio signals into a digital reverberator, the method first sets the input buffers of all directivity gain filters to zero. The method also resets a status flag for each directivity filter which indicates if any signals have been added to the respective directivity gain filter input buses.

When an audio signal is selected to be input to the reverberator, the method first checks if the audio signal is associated with a directivity gain filter. This can be implemented by checking if a directivity gain filter pointer associated with the input audio signal has a valid value. If it has a valid value, the method adds the input audio signal to the input bus of the corresponding directivity gain filter. A status flag is set for this directivity filter indicating that audio signal has been added to its input bus. If the pointer is null, the input audio signal is added directly into the reverberator input bus.

When all input audio signals have been added either to the reverberation input bus (no directivity-influenced gain filter) or into one of the directivity-influenced gain filter input buses, the method performs filtering with those directivity-influenced filters which have at least one audio signal added to their input buses. The method loops through the directivity-influenced filters, for each directivity-influenced gain filter determines from the status flag if at least one audio signal has been added to this directivity-influenced gain filter input bus, and if at least one audio signal has been added to the input bus performs filtering with this directivity-influenced gain filter and adds the output of this directivity-influenced gain filter to the reverberator input bus. Directivity-influenced filters which have no audio signals added to their input buses can be left unprocessed.

Finally the digital reverberator is used to process the reverberator input bus signal to produce output signals.

Figure 11:
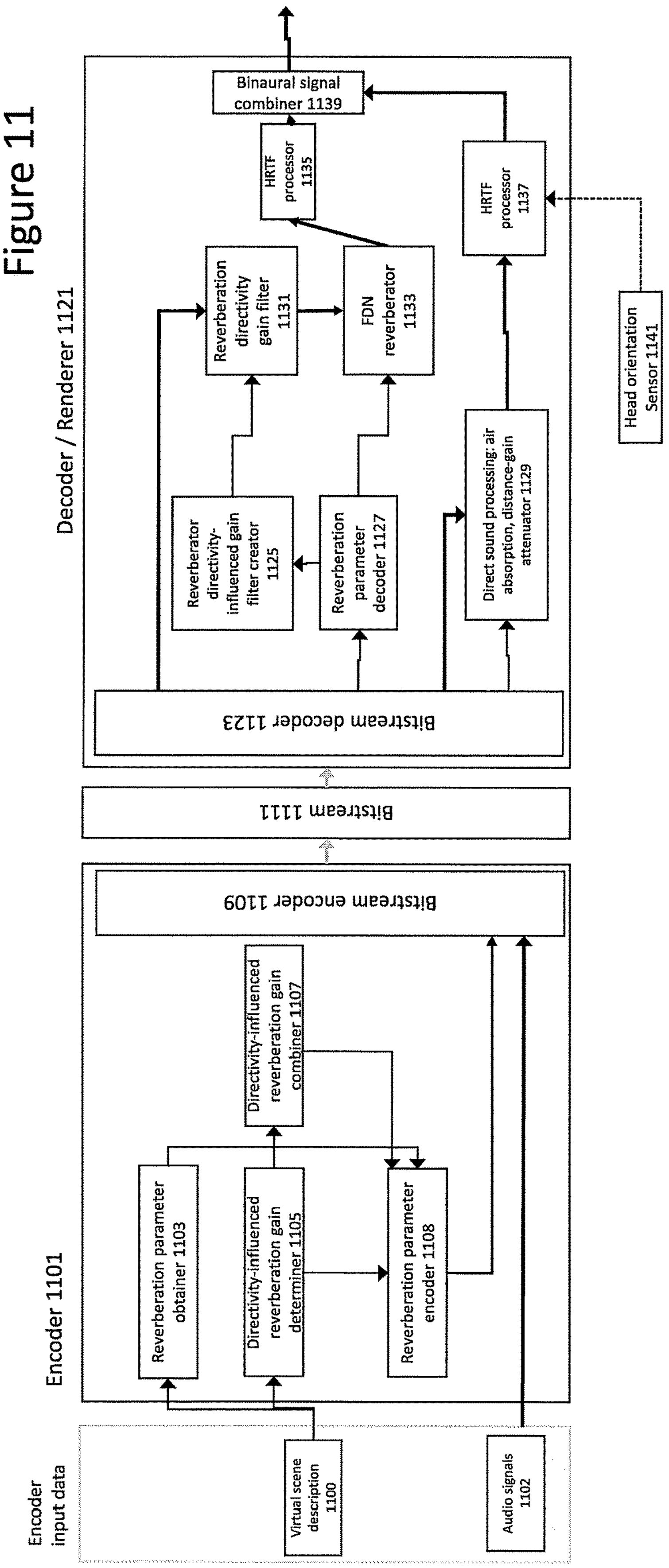
FIG. 11 shows schematically an example system apparatus within which some embodiments can be implemented.

FIG. 11 depicts an example system implementation of the embodiments as discussed above. The encoder 1101 parts can for example be implemented on a suitable content creator computer and/or network server computer.

The encoder 1101 is configured to receive the virtual scene description 1100 and the audio signals 1102. The virtual scene description can be provided in the MPEG-I Encoder Input Format (EIF) or in other suitable format. Generally, the virtual scene description contains an acoustically relevant description of the contents of the virtual scene, and contains, for example, the scene geometry as a mesh, acoustic materials, acoustic environments with reverberation parameters, positions of sound sources, and other audio element related parameters such as whether reverberation is to be rendered for an audio element or not. The encoder 1101 in some embodiments comprises a reverberation parameter obtainer 1103 configured to receive the virtual scene description 1100 and configured to obtain the reverberation parameters. The reverberation parameters can in an embodiment be obtained from the RT60, DDR, and predelay from acoustic environments.

The encoder 1101 furthermore in some embodiments comprises a directivity-influenced reverberation gain determiner 1105. The directivity-influenced reverberation gain determiner 1105 is configured to receive the virtual scene description 1100 and more specifically the directivity data for sound sources it contains and generate directivity-influenced reverberation gains which can be passed to the directivity-influenced reverberation gain combiner 1107 and reverberation parameter encoder 1108.

The encoder 1101 furthermore in some embodiments comprises a directivity-influenced reverberation gain combiner 1107. The directivity-influenced reverberation gain combiner 1107 obtains the directivity-influenced reverberation gains and determines whether any gain grouping should be applied. This information can be passed to the reverberation parameter encoder 1108. The combiner 1107 is optional.

The encoder 1101 furthermore in some embodiments comprises a directivity-influenced reverberation parameter encoder 1108. The directivity-influenced reverberation parameter encoder 1108 in some embodiments is configured to obtain the directivity-influenced reverberation gains and optionally the combiner information and write the bitstream description containing the reverberator parameters and the frequency-dependent reverberation gain data. This can then be output to the bitstream encoder 1109.

The encoder 1101 furthermore in some embodiments comprises a bitstream encoder 1109 which is configured to receive the output of the reverberation parameter encoder 1109 and the audio signals and generate the bitstream 1111 which can be passed to the bitstream decoder 1123. In other words the normative bitstream can be configured to contain the frequency-dependent reverberation gain data and reverberator parameters described using the syntax described here. The bitstream 1111 in some embodiments can be streamed to end-user devices or made available for download or stored The output of the encoder is the bitstream 1111 which is made available for downloading or streaming. The decoder/renderer 1121 functionality runs on end-user-device, which can be a mobile device, personal computer, sound bar, tablet computer, car media system, home HiFi or theatre system, head mounted display for AR or VR, smart watch, or any suitable system for audio consumption.

The decoder 1121 in some embodiments comprises a bitstream decoder 1123 configured to decode the bitstream to obtain frequency-dependent reverberation gain data and reverberator parameters.

The decoder 1121 further can comprise a reverberation parameter decoder 1127 configured to obtain the encoded frequency-dependent reverberation gain data and reverberator parameters from the bitstream decoder 1123 and decode these in an opposite or inverse operation to the reverberation parameter encoder 1108.

The decoder 1121, in some embodiments, comprises a reverberation directivity-influenced gain filter creator 1125 which receives the output of the reverberation parameter decoder 1127 and generates the reverberator directivity influenced gain filter and passes this to the reverberation directivity gain filter 1131.

In some embodiments the decoder 1121 comprises a reverberation directivity-influenced gain filter 1131 which is configured to filter the reverberation-influenced directivity gains and provide an input to the FDN reverberator 1133. The FDN reverberator 1133 can be initialized with the reverberator parameters provided by the Reverberation parameter decoder 1127.

The decoder 1121 is configured to comprise the FDN reverberator 1133 configured to apply a FDN reverberator 1133 to generate the late reverberated audio signals which are passed to a head related transfer function (HRTF) processor 1135.

In some embodiments the decoder 1121 comprises a HRTF processor 1135 configured to apply a HRTF processing to the late reverberated audio signals to generate a binaural audio signal and output this to a binaural signal combiner 1139.

Additionally the decoder/renderer 1011 comprises a direct sound processor 1129 which is configured to receive the decoded audio signals from the bitstream decoder 1123 and configured to implement any direct sound processing such as air absorption and distance-gain attenuation and which can be passed to a HRTF processor 1137 which with the head orientation determination can generate the direct sound component which with the reverberant component from the HRTF processor 1135 is passed to a binaural signal combiner 1139. The binaural signal combiner 1139 is configured to combine the direct and reverberant parts to generate a suitable output (for example for headphone reproduction).

Furthermore in some embodiments the decoder comprises a head orientation determiner 1141 which passes the head orientation information to the HRTF processor 1137.

The decoder further comprises a binaural signal combiner configured to take input from the HRTF processor 1135 and the HRTF processor 1137 and generate the binaural audio signals which can be output to the suitable transducer set such as headphones/speaker set. Although not shown, there can be various other audio processing methods applied such as early reflection rendering combined with the proposed methods.

MPEG-I Audio Phase 2 as described is configured to normatively standardize the bitstream and the renderer processing. There is also an encoder reference implementation but it can be modified later on as long as the output bitstream follows the normative specification. This allows improving the codec quality also after the standard has been finalized with novel encoder implementations.

In our invention main embodiment, the portions going to different parts of the MPEG-I standard are as follows, referring to FIG. 11:

Encoder reference implementation will contain

Receiving an encoder input format description containing a Virtual scene description with one or more sound sources with directivities and Room-related parameters Obtaining reverberator parameters from the Room-related parameters Directivity-influenced reverberation gain determination Optionally, Directivity-influenced reverberation gain combining Writing a bitstream description containing the reverberator parameters and frequency-dependent reverberation gain data The normative bitstream shall contain the frequency-dependent reverberation gain data and reverberator parameters described using the syntax described here. The bitstream shall be streamed to end-user devices or made available for download or stored.

The normative renderer shall decode the bitstream to obtain frequency-dependent reverberation gain data and reverberator parameters, initialize processing components for reverberation rendering using the parameters, and perform reverberation rendering using the initialized processing components using the presented method.

For VR rendering, reverberator parameters are derived in the encoder and sent in the bitstream as depicted in FIG. 11.

For AR rendering, reverberator parameters are derived in the renderer based on a listening space description format (LSDF) file or corresponding representation (not shown in FIG. 11).

The source directivity data is available in the encoder, currently there are no use cases of providing new sound sources directly to the renderer. However, in the future such use cases could emerge which would mean that the directivity-influenced reverberation gain determining would be performed in the renderer.

The complete normative renderer will also obtain other parameters from the bitstream related to room acoustics and sound source properties, and use them to render the direct sound, early reflection, diffraction, sound source spatial extent or width, and other acoustic effects in addition to diffuse late reverberation. The invention presented here focuses on the rendering of the diffuse late reverberation part and in particular how to adjust the diffuse late reverberation spectrum based on sound source directivity properties.

Figure 12:
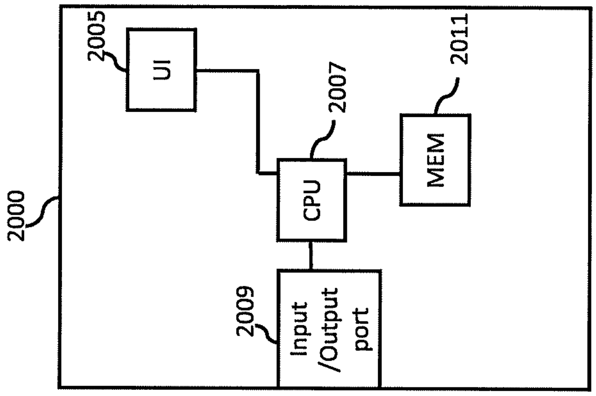
FIG. 12 shows an example device suitable for implementing the apparatus shown in previous figures.

With respect to FIG. 12 an example electronic device which may be used as any of the apparatus parts of the system as described above. The device may be any suitable electronics device or apparatus. For example in some embodiments the device 2000 is a mobile device, user equipment, tablet computer, computer, audio playback apparatus, etc. The device may for example be configured to implement the encoder or the renderer or any functional block as described above.

In some embodiments the device 2000 comprises at least one processor or central processing unit 2007. The processor 2007 can be configured to execute various program codes such as the methods such as described herein.

In some embodiments the device 2000 comprises a memory 2011. In some embodiments the at least one processor 2007 is coupled to the memory 2011. The memory 2011 can be any suitable storage means. In some embodiments the memory 2011 comprises a program code section for storing program codes implementable upon the processor 2007. Furthermore in some embodiments the memory 2011 can further comprise a stored data section for storing data, for example data that has been processed or to be processed in accordance with the embodiments as described herein. The implemented program code stored within the program code section and the data stored within the stored data section can be retrieved by the processor 2007 whenever needed via the memory-processor coupling.

In some embodiments the device 2000 comprises a user interface 2005. The user interface 2005 can be coupled in some embodiments to the processor 2007. In some embodiments the processor 2007 can control the operation of the user interface 2005 and receive inputs from the user interface 2005. In some embodiments the user interface 2005 can enable a user to input commands to the device 2000, for example via a keypad. In some embodiments the user interface 2005 can enable the user to obtain information from the device 2000. For example the user interface 2005 may comprise a display configured to display information from the device 2000 to the user. The user interface 2005 can in some embodiments comprise a touch screen or touch interface capable of both enabling information to be entered to the device 2000 and further displaying information to the user of the device 2000. In some embodiments the user interface 2005 may be the user interface for communicating.

In some embodiments the device 2000 comprises an input/output port 2009. The input/output port 2009 in some embodiments comprises a transceiver. The transceiver in such embodiments can be coupled to the processor 2007 and configured to enable a communication with other apparatus or electronic devices, for example via a wireless communications network. The transceiver or any suitable transceiver or transmitter and/or receiver means can in some embodiments be configured to communicate with other electronic devices or apparatus via a wire or wired coupling.

The transceiver can communicate with further apparatus by any suitable known communications protocol. For example in some embodiments the transceiver can use a suitable universal mobile telecommunications system (UMTS) protocol, a wireless local area network (WLAN) protocol such as for example IEEE 802.X, a suitable short-range radio frequency communication protocol such as Bluetooth, or infrared data communication pathway (IRDA).

The input/output port 2009 may be configured to receive the signals.

In some embodiments the device 2000 may be employed as at least part of the renderer. The input/output port 2009 may be coupled to headphones (which may be a headtracked or a non-tracked headphones) or similar.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general-purpose computers, special purpose computers, microprocessors, digital signal processors (DSPs), application specific integrated circuits (ASIC), gate level circuits and processors based on multi-core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, California and Cadence Design, of San Jose, California automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

The invention claimed is:

1. An apparatus for assisting spatial rendering for room acoustics, the apparatus comprising:
- at least one processor; and
- at least one memory storing instructions that, when executed with the at least one processor, cause the apparatus at least to:
  - obtain directivity data having an identifier, wherein the directivity data comprises data for at least two separate directions;
  - obtain at least one room parameter;
  - determine information associated with the directivity data;
  - determine gain data based on the determined information;
  - determine averaged gain data based on the gain data; and
  - generate a bitstream defining a rendering, the bitstream comprising the averaged gain data and the at least one room parameter such that at least one audio signal associated with the identifier is configured to be rendered based on the at least one room parameter and the determined averaged gain data.

2. The apparatus as claimed in claim 1, wherein determining the information associated with the directivity data comprises the instructions, when executed with the at least one processor, cause the apparatus to:
- determine a directivity-model based on the directivity data.

3. The apparatus as claimed in claim 2, wherein the directivity model is one of:
- a two-dimensional directivity model, wherein the at least two separate directions are arranged on a plane; or
- a three-dimensional directivity model, wherein the at least two separate directions are arranged within a volume.

4. The apparatus as claimed in claim 1, wherein determining the averaged gain data comprises the instructions, when executed with the at least one processor, cause the apparatus to:
- determine the averaged gain data based on a spatial averaging of the gain data independent of a sound source direction and/or orientation.

5. The apparatus as claimed in claim 1, wherein determining the information associated with the directivity data comprises the instructions, when executed with the at least one processor, cause the apparatus to:
- estimate a continuous directivity model based on the obtained directivity data.

6. The apparatus as claimed in claim 2, wherein determining the averaged gain data comprises the instructions, when executed with the at least one processor, cause the apparatus to:
- determine the averaged gain data based on a spatial averaging of gains for the at least two separate directions further based on the determined directivity-model.

7. The apparatus as claimed in claim 1, wherein obtaining the at least one room parameter comprises the instructions, when executed with the at least one processor, cause the apparatus to:
- obtain at least one digital reverberator parameter.

8. The apparatus as claimed in claim 1, wherein determining the averaged gain data based on the gain data comprises the instructions, when executed with the at least one processor, cause the apparatus to:
- determine frequency dependent gain data.

9. The apparatus as claimed in claim 8, wherein the frequency dependent gain data is graphic equalizer coefficients.

10. A method for an apparatus for assisting spatial rendering for room acoustics, the method comprising:
- obtaining directivity data having an identifier, wherein the directivity data comprises data for at least two separate directions;
- obtaining at least one room parameter;
- determining information associated with the directivity data;
- determining gain data based on the determined information;
- determining averaged gain data based on the gain data; and generating a bitstream defining a rendering, the bitstream comprising the averaged gain data and the at least one room parameter such that at least one audio signal associated with the identifier is configured to be rendered based on the at least one room parameter and the determined averaged gain data.

* * * * *